(12) United States Patent
Nakayama

(10) Patent No.: US 7,449,117 B2
(45) Date of Patent: Nov. 11, 2008

(54) FILTRATION UNIT, INSTALLATION METHOD FOR A FILTRATION UNIT AND FILTRATION APPARATUS

(75) Inventor: Tsuyoshi Nakayama, Chuo-ku (JP)

(73) Assignee: Tsukishima Kikai Co., Ltd., Tokyo (JP)

( * ) Notice: Subject to any disclaimer, the term of this patent is extended or adjusted under 35 U.S.C. 154(b) by 180 days.

(21) Appl. No.: 10/954,772

(22) Filed: Sep. 30, 2004

(65) Prior Publication Data

US 2005/0072724 A1   Apr. 7, 2005

(30) Foreign Application Priority Data

Oct. 6, 2003   (JP)   ............... 2003-347466

(51) Int. Cl.
*C02F 1/28*   (2006.01)
*C02F 1/32*   (2006.01)

(52) U.S. Cl. ............... 210/650; 210/663; 210/694; 210/748; 210/791; 210/803; 210/205; 210/207; 210/212; 210/221.1; 210/265; 210/802; 210/266; 210/280; 210/282; 210/323.1; 210/332; 210/407; 210/521; 210/523; 210/527; 210/908

(58) Field of Classification Search ............... 210/221.2, 210/257.2, 280

See application file for complete search history.

(56) References Cited

U.S. PATENT DOCUMENTS 6,517,723 B1 *   2/2003   Daigger et al. ............... 210/605

2005/0072724 A1 *   4/2005   Nakayama ............... 210/280

FOREIGN PATENT DOCUMENTS

| JP | 8-57273 | | 3/1996 |
|---|---|---|---|
| JP | 9-24250 | | 1/1997 |
| JP | 09174094 | A * | 7/1997 |
| JP | 10290993 | A * | 11/1998 |
| JP | 10-323683 | | 12/1998 |
| JP | 11-179385 | | 7/1999 |
| JP | 2003-94056 | | 4/2003 |
| JP | 2003-103150 | * | 4/2003 |
| JP | 2005111343 | A * | 4/2005 |
| JP | 2006205074 | A * | 8/2006 |
| JP | 2007160132 | A * | 6/2007 |
| WO | WO 2007066471 | A1 * | 6/2007 |

* cited by examiner

Primary Examiner—Robert James Popovics
(74) Attorney, Agent, or Firm—William L. Androlia; H. Henry Koda

(57) ABSTRACT

A filtration unit that includes a casing that has a closed bottom and is immersed in a water storage tank (or water storage pond) into which raw water is introduced, the casing being composed of a introduction port which introduces the raw water in the water storage tank into the casing, an active carbon supply device which adds active carbon to the introduced raw water, an agitator which agitates the raw water inside the casing to which active carbon has been added, a filtration module which filters the raw water, a back flow preventing device which prevents the raw water inside the casing from flowing back into the introduction port and being discharged into the water storage tank, and a discharging device which discharges the raw water from the casing.

18 Claims, 13 Drawing Sheets

FILTRATION UNIT, INSTALLATION METHOD FOR A FILTRATION UNIT AND FILTRATION APPARATUS

BACKGROUND OF THE INVENTION

1. Technical Field

The present invention relates to a filtration unit which is provided in a water storage tank, water storage pond such as a settling pond in a water cleaning plant, etc. in order to perform a filtration treatment on raw water; and the present invention further relates to an installation method for such a filtration unit and to a filtration apparatus in which this filtration unit is installed.

2. Description of the Related Art

As filtration apparatuses of the type described above, apparatuses in which a filtration module constructed by means of a hollow filament membrane or the like is immersed in a tank into which raw water is introduced, and aeration pipes that spread air inside the tank are installed beneath this filtration module, have been proposed in, for example, Japanese Patent Application Laid-Open (Kokai) Nos. H8-57273, H9-24250, H10-323683 and 2003-94056 and in Japanese Patent No. 3440402.

In the filtration apparatuses in the above prior arts, the filtration efficiency is improved by adding active carbon to the raw water that is introduced into the tank, or immersing or disposing active carbon inside the tank, and causing organic matter, etc., contained in the raw water to be adsorbed by this active carbon; moreover, the active carbon that has thus adsorbed organic matter, etc., contained in the raw water settles to the bottom of the tank and is extracted, or is discharged together with the raw water that is contained in the tank.

However, in the filtration apparatus disclosed in Japanese Patent Application Laid-Open (Kokai) No. H9-24250, active carbon is added to the raw water itself that is introduced into the tank (vessel). In the filtration apparatus shown in Japanese Patent No. 3440402, active carbon is immersed in the actual treatment tank into which the raw water itself is introduced.

Accordingly, in both apparatuses described above, a large amount of active carbon must be added relative to the amount of raw water that is introduced in order to achieve a sufficient improvement in the filtration efficiency by means of this active carbon. As a result, the cost of the apparatus increases. Furthermore, since mud, etc., is still contained in large quantities in the raw water that is introduced into such a tank, the active carbon that is extracted from the bottom of the vessel (especially as in Japanese Patent Application Laid-Open (Kokai) No. H9-24250) is in a state in which the active carbon is mixed with this mud and must be treated "as is" as a waste product.

Meanwhile, in the filtration apparatuses described in Japanese Patent Application Laid-Open (Kokai) Nos. H8-57273, H10-323683 and 2003-94056, raw water from which such mud has been separated beforehand to some extent in a precipitation and separation tank, etc., is introduced into a separate treatment tank, etc., and filtered by means of active carbon and a filtration module. In this case, however, two tanks are required, and thus a large space is required for installing the filtration apparatus.

BRIEF SUMMARY OF THE INVENTION

Accordingly, the object of the present invention is to provide a filtration unit that prevents a space, which is required for installing a filtration apparatus as a whole including the water storage tank, etc., from increasing and to keep the costs down by reducing the amount of active carbon that is added and by effectively utilizing this active carbon, when raw water to which active carbon has been added is filtered by a filtration module made from a hollow filament membrane or the like.

The above object is accomplished by a unique structure of the present invention for a filtration unit that include a casing that is in substantially a tubular or cylindrical shape and has a bottom and is disposed so as to be immersed in a water storage tank or a water storage pond (which are hereinafter collectively referred to as a "water storage tank") into which raw water is introduced; and in the present invention, the casing is comprised of:

an introduction port that introduces raw water contained in the water storage tank into the casing,
an active carbon supply means that adds active carbon to the raw water introduced into the casing,
an agitation means that agitates the raw water which is inside the casing and to which the active carbon has been added,
a filtration module that filters the raw water,
a back flow prevention means that prevents the raw water inside the casing from flowing back through the introduction port and being discharged into the water storage tank, and
a discharge means that discharges the raw water from the casing.

The above object is further accomplished by a method for installing a filtration unit of the present invention that allows such a filtration unit(s) as described above to be installed in a unique manner inside the water storage tank, and the above object is further accomplished by a filtration apparatus of the present invention in which such a filtration unit(s) as described above is installed inside a water storage tank.

In the filtration unit of the present invention, the casing thereof is disposed so that this casing is immersed in a water storage tank into which raw water is introduced, the raw water inside the water storage tank is introduced into the casing of the filtration unit via an introduction port(s) formed in this casing, active carbon is added to this raw water by the active carbon supply means, and the raw water is filtered by the filtration module. Accordingly, there is no need for any space beyond that required for the water storage tank in order to filter raw water in the installation method of the present invention, in which such a filtration unit(s) is installed in a water storage tank, or in the filtration apparatus of the present invention, in which such a filtration unit(s) is installed.

Furthermore, since clear raw water from which mud and the like have been removed to some extent by precipitation and separation in the water storage tank is introduced into the casing and filtered, the amount of active carbon that must be added can be small.

Moreover, the amount of mud or the like, which is discharged when the added active carbon is discharged by the discharge means following filtration together with the raw water remaining inside the casing and the mud or the like that has been separated from the raw water by filtration, is small. Accordingly, the recovered active carbon can be re-used by, for example, being added to the raw water that is introduced into the water storage tank. Thus, it is possible to lower the cost of filtration.

On the other hand, in the case of a filtration unit in which the casing is immersed in a water storage tank, and raw water inside this water storage tank is introduced into the casing via the introduction port, if a filtration operation that uses the filtration module is performed by continuously introducing the raw water through the introduction port when such raw water to which active carbon has been added is filtered by the filtration module while being agitated by the agitation means, the agitated raw water containing active carbon will flow back to the introduction port and be discharged via the introduction port into the water storage tank outside the casing. There is thus a danger that improvement of filtration efficiency will be hindered and that the cost reduction effect will be lost because replenishment of the active carbon that flows back together with the raw water is required.

In view of the above, the structure of the present invention includes a back flow prevention means, and this back flow prevention means prevents the raw water inside the casing from flowing back to the introduction port and from being discharged into the water storage tank. Accordingly, even if the filtration operation is performed by continuously introducing raw water, the active carbon can be sufficiently retained inside the casing, and a more certain improvement in the filtration efficiency and reduction of cost is achieved.

When the aeration pipes such as those described above are used as the agitation means, the raw water that is inside the casing and above the aeration pipes is agitated, but the raw water located beneath the aeration pipes is not sufficiently agitated. Accordingly, in the present invention, descending pipes that extend downward inside the casing from the introduction port are used as the back flow prevention means, and the lower-end openings of the descending pipes are positioned at a point lower than the agitation means. As a result, it is possible to securely prevent the back flow of the raw water, which contains active carbon and is inside the casing, to the introduction port from the lower-end openings, so that the raw water inside the water storage tank can be continuously introduced into the casing of the filtering unit from the introduction port via the descending pipes. Furthermore, in cases where an aeration means that spreads air throughout the interior of the casing (such as the aeration pipes) is thus used as the agitation means, such aeration means can also be used as a cleaning means that cleans the filtration module by air scrubbing, so that the operation becomes more efficient.

Furthermore, in the present invention, the filtration module includes a membrane filtered water pipe that discharges the filtered water filtered from the raw water, the agitation means comprises a fluid supply pipe through which a fluid that agitates the raw water inside the casing is supplied, and the discharge means comprises a discharge pipe that discharges the raw water. In this structure, a structure and effort required to pass the pipes through the casing become unnecessary. In order to prevent the spacing between the casing and the inside walls of the water storage tank and the spacing between the casings of adjacent filtration units in cases where a plurality of filtration units are disposed in the water storage tank from becoming larger than it is actually necessary, it is preferable that at least one of the membrane filtered water pipe, fluid supply pipe and discharge pipe, or all of these pipes, be installed within the casing from the upper part of the casing.

Furthermore, in the present invention, the discharge means includes a discharge pipe that is connected to a suction pump. In this case, it is desirable that the discharge open in the bottom of the casing so that the raw water that remains inside the casing following filtration or following cleaning is assuredly discharged together with the active carbon that has adsorbed organic matter, etc., the filtered mud or the adhering matter, etc., that has been stripped from the filtration module by cleaning.

It is desirable that a control means which controls the passage of raw water via the introduction port formed in the casing be provided in the introduction port. By way of closing the introduction port using the control means so that the raw water is prevented from passing through the introduction port during the agitation or cleaning, a discharge of raw water containing active carbon from the casing into the water storage tank is prevented more reliably. Furthermore, by way of closing the introduction port when the raw water inside the casing is discharged by the discharge means following filtration or cleaning, the raw water inside the casing that is to be discharged can be set at a minimum discharge amount without being diluted by the inflow of raw water from the water storage tank. In addition, when the hollow filament membranes, etc., of the filtration module are cleaned by means of, for example, a chemical solution, it is merely necessary to close the introduction port by the control means and to replace the raw water inside the casing with the chemical solution; and there is no need to fill the entire interior of the water storage tank in which the immersed membranes are disposed with chemical solutions as is required in the chemical cleaning process in the conventional immersed membranes.

Furthermore, in the filtration unit of the present invention, the filtration module is provided inside the casing and the filtration unit is positively unitized. Accordingly, accidents in which the chemical solution flows into the water storage tank is prevented by pulling the filtration unit including the casing upward and by replacing the raw water inside the casing with chemical solutions outside the water storage tank at the time of the chemical washing. Moreover, since the chemical washing can be performed with the filtration module disposed "as is" inside the casing, no damage occurs to the hollow filament membranes unlike the conventional manner of cleaning in which the filtration module is taken out independently. Thus, cleaning work is greatly facilitated in the present invention.

In addition, in the present invention, the introduction port opens in the water surface of the raw water in the water storage tank so as to allow the raw water to be introduced. Thus, the introduction of floating matters such as dirt that floats on the water surface of the raw water held in the water tank or the like into the casing along with the raw water can be prevented by way of providing a partition plate, which restricts the inflow of the raw water in the water surface area, along the outer circumference of the casing and at least around the introduction port.

In the present invention, as long as the casing is in the shape of a tube or a cylinder and has a bottom, i.e., a tubular shape that has a closed bottom, the casing may have an angular tubular or cylindrical shape that includes various types of polygonal shapes when seen from above or in a top view, a cylindrical shape that shows a round shape when seen from above or in a top view, or an oval cylindrical shape, etc. However, the external shape of the filtration module is generally a box shape such as a rectangular block. Accordingly, in order to accommodate such a filtration module inside the casing efficiently, it is desirable that the casing be in a rectangular tubular or cylindrical shape that has a rectangular shape or square shape when seen from above or in a top view.

In the installation method of the present invention for installing such a filtration unit(s) as described above in a water storage tank, and in the filtration apparatus of the present invention in which such a filtration unit(s) as described above is installed in such a water storage tank, it is desirable that the filtration unit be positioned on the opposite side of the water storage tank, when seen from above, from the location where the raw water is introduced. With this structure, clearer raw water, from which mud or the like has been separated by precipitation that is executed on the raw water introducing side of the water storage tank, is introduced into the casing of the filtration unit and filtered. Accordingly, the amount of active carbon that is added can be greatly reduced, and even more efficient filtration is performed.

DETAILED DESCRIPTION OF THE INVENTION

FIGS. 1 through 4 show one embodiment of the filtration unit of the present invention.

Figure 5:
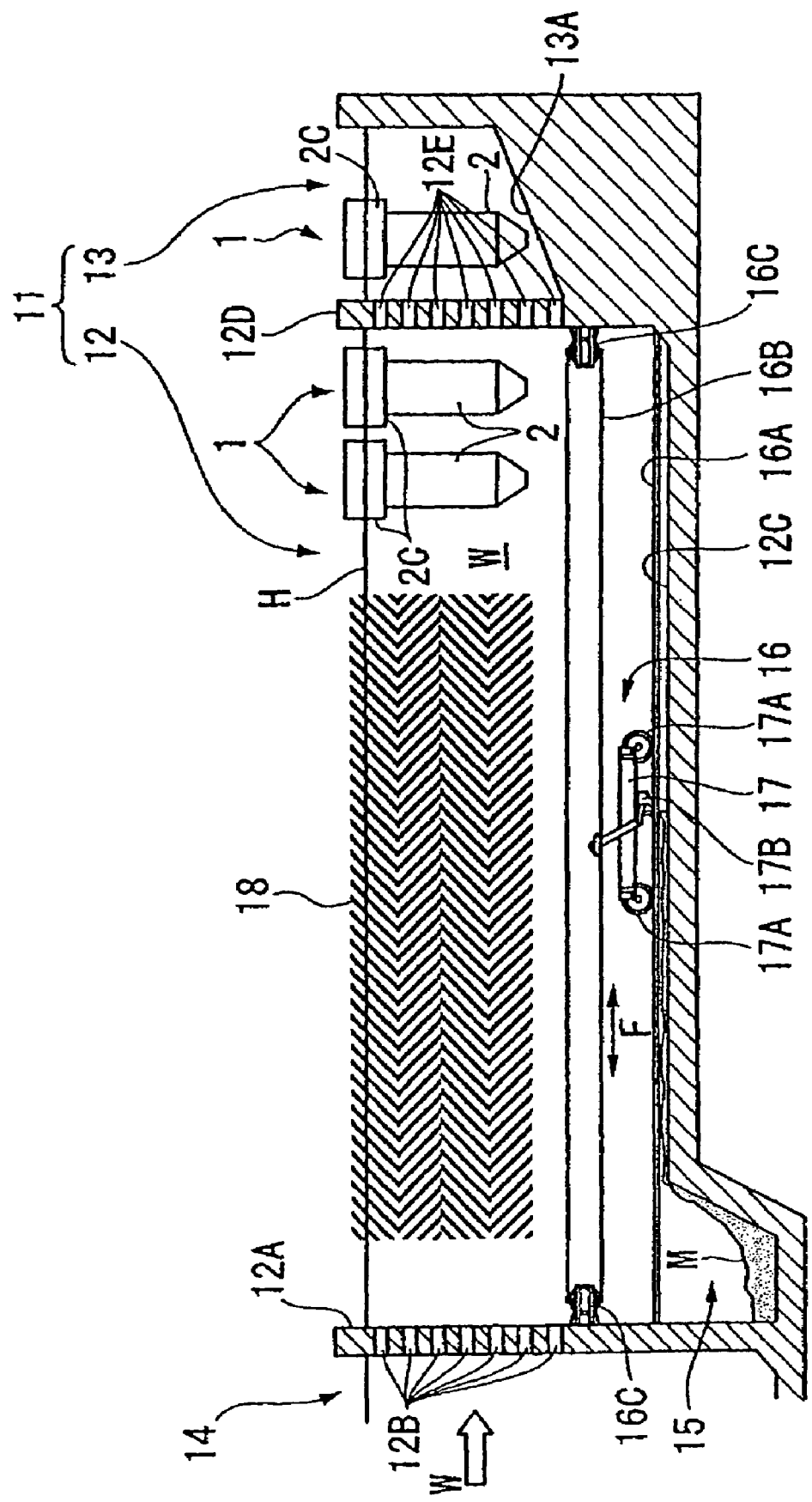
FIG. 5 is a sectional side view of one embodiment of the filtration apparatus of the present invention in which the filtration unit shown in FIG. 1 is installed.

FIG. 5 shows one embodiment of the filtration apparatus of the present invention in which the filtration unit 1 of this embodiment is installed inside a water storage tank 11 such as a settling tank in a water cleaning plant, etc.

FIGS. 6 through 14 illustrate a filtration method for raw water W that uses the filtration unit 1.

In the filtration unit 1 of the shown embodiment, filtration modules 3 and agitation means 4 are accommodated inside a casing 2. Substantially the casing 2 is formed in the shape of a tube that has a bottom, and this casing 2 is provided with introduction ports 2A into which raw water W is introduced. The casing 2 is further provided with an active carbon supply means 5 that adds active carbon C to the raw water W that is introduced into this casing 2, a back flow prevention means 6 that prevents the back flow of raw water W inside the casing 2 to the introduction ports 2A, and a discharge means 7 that discharges the raw water W from the casing 2.

The casing 2 is formed in an oblong rectangular shape (when seen from above or in a top view) from a metal material, etc., that has a high corrosion resistance such as stainless steel. Furthermore, the casing 2 is formed in the shape of a rectangular tube that is long in the vertical direction, and it has a bottom. The height of the casing 2 is greater than the lengths of the longer and shorter sides of the rectangular shape top and bottom. In other words, the casing 2 is in a shape in which the bottom of a rectangular tube is closed off.

The casing 2 is disposed so that the height direction of the casing is oriented in the vertical direction with its bottom facing down. The bottom of this casing 2 is substantially in the shape of a downward-protruding truncated square pyramid which has pyramid faces that are respectively continuous to the four side surfaces of the casing 2 and which shows a gradually decreasing cross section in the downward direction. The substantial shape of a downward-protruding truncated square pyramid, in this embodiment, is a shape that is employed to reduce the residual amount of drain water and does not place any limitation on the bottom shape used in the present invention.

The introduction ports 2A are formed in the upper part of the casing 2, and control means 2B that control the flow of the raw water W through the introduction ports 2A are provided in the introduction ports 2A.

The introduction ports 2A are formed by the inner circumferential portions of a plurality of tubular members that are caused to protrude from the upper wall surfaces of the casing 2 at intervals around the circumference of the casing 2 so that the introduction ports pass through the wall surfaces.

The control means 2B are formed by opening and closing valves such as butterfly valves and are installed in the root portions of the tubular members. Raw water W is introduced into the casing 2 via the introduction ports 2A when the introduction ports 2A are opened by the opening and closing valves via a driving means (not shown in the drawings); and when the introduction ports 2A are closed, the inside of the casing 2 is isolated from the outside raw water W, and the inflow of raw water W into the casing 2 and the outflow of raw water W from the casing 2 via the introduction ports 2A are, as a result, prevented. The through-flow of raw water W is thus controlled.

As shown in FIGS. 6 through 14, the introduction ports 2A are disposed at a height that opens into the water surface H of the raw water W held in the water storage tank 11, so that the water introduction ports 2A open into this water surface H. However, this does not limit the manner of the water inflow control of the present invention.

A partition plate 2C is provided around the outer circumference of the casing 2 so that the partition plate 2C surrounds the introduction ports 2A. The partition plate 2C is comprised of four rectangular plate members that are respectively parallel to the upper wall surfaces of the casing 2 and are formed into the shape of a frame wall with no gaps in the circumferential direction so that the plate members form a surrounding rectangular shape (when seen from above or in a top view) that is slightly larger than the above-described rectangular shape (when seen from above or in a top view) of the casing 2. The top and bottom of the partition plate 2C are left open. Furthermore, as seen from FIGS. 5 through 14, the partition plate 2C is provided so that there is a gap between the partition plate 2C and the introduction ports 2A and so that the partition plate 2C is positioned at the height of the water surface H of the raw water W inside the water storage tank 11. Accordingly, the raw water W flows via beneath this partition plate 2C into the space between this partition plate 2C and the casing 2 and is then introduced into the casing 2 via the introduction ports 2A. Dirt and other matters floating on the water surface H is thus prevented from entering "as is" into the interior of the casing 2.

The filtration modules 3 that are accommodated inside the casing 2 are modules in which, for example, numerous elements that have hollow filament membranes stretched in screen form or numerous elements that have flat-film-form separating membranes are laminated, or in which numerous tubular ceramic film elements are formed into bundles and put together by means of headers (not shown in the drawings) so that modules are formed. In the shown embodiment, the individual filtration modules 3 have the shape of substantially a rectangular block that are long in the horizontal direction. Furthermore, a plurality of (four) such filtration modules 3 that have the same size and shape are installed inside the casing 2 so that the pair of side surfaces extend in the direction of length of each module oriented in the horizontal direction, the longer sides of the side surfaces are oriented parallel to the longer sides of the rectangular shape formed by the casing 2 (when seen from above or in a top view), and the filtration modules 3 stacked in a row so that the modules 3 are lined up in the vertical direction with the side surfaces that face each other.

The plurality of filtration modules 3 that are thus stacked are arranged so that the filtration module 3 at the uppermost end of the stack is positioned below the introduction ports 2A of the casing 2 as shown in the figures. The filtration modules 3 that are adjacent to each other in the vertical direction may adhere tightly to each other or may be installed with an appropriate gap left between such adjacent modules. The headers of the respective filtration modules 3 are connected to a filtration suction pump 3B via a membrane filtered water pipe 3A, and the filtered water T that is filtered from the raw water W by the filtration modules 3 is discharged by this filtration suction pump 3B via the membrane filtered water pipe 3A.

In the shown embodiment, the filtration modules 3 of a rectangular block shape are installed in a horizontal attitude and lined up in the vertical direction. However, as seen from FIG. 4, for example, flat-plate-form flat-membrane-type filtration modules 3 can be installed in the casing 2 so that these modules are placed in a vertical attitude and lined up in the horizontal direction; and in addition, a plurality of rows of such modules can be installed. Furthermore, instead of flat-plate-form modules, the modules can be those that have hollow filaments bundled in the vertical direction. Thus, there are no restrictions on the modules used in the present invention.

In the shown embodiment, the agitation means 4 also serves as a cleaning means for the filtration modules 3, so that the agitation means 4 agitates the raw water W and cleans the filtration modules 3 using a fluid that is supplied to the interior of the casing 2. In particular, an aeration means that spreads air A used as a fluid for agitation and cleaning inside the casing 2 is used in this embodiment.

Figure 1:
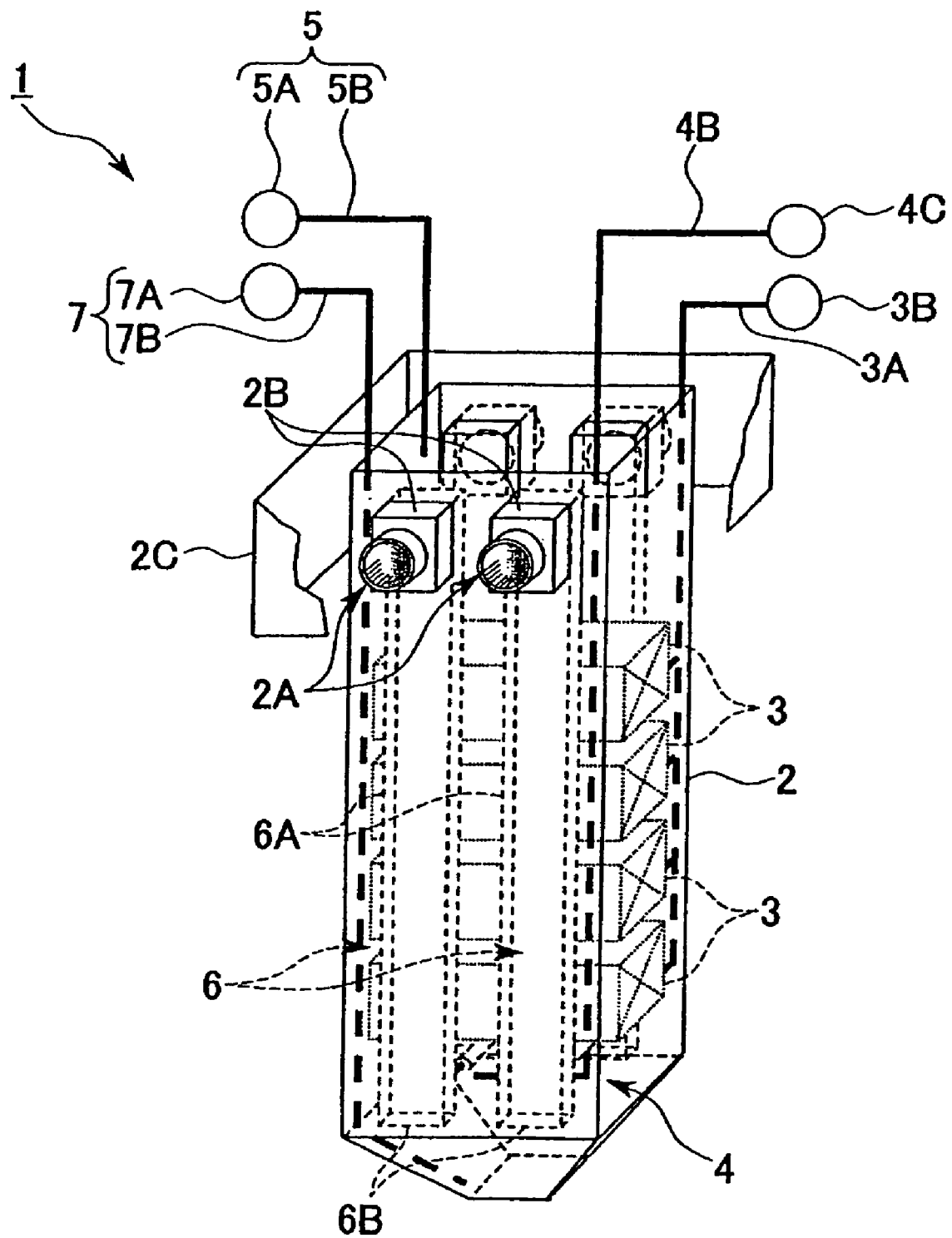
FIG. 1 is a partially cut-away see-through perspective view of one embodiment of the filtration unit of the present invention.
Figure 2:
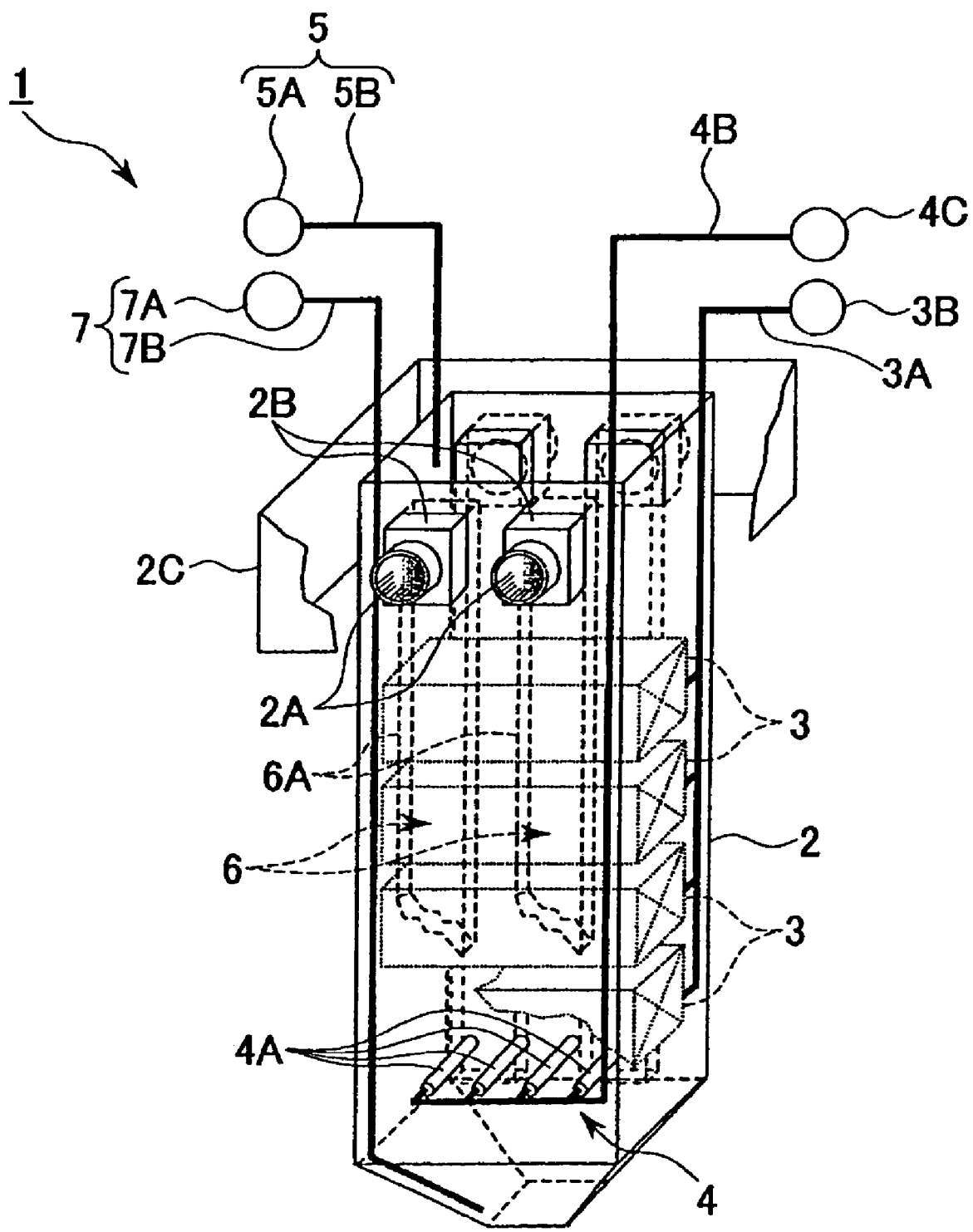
FIG. 2 is a further cut-away view of the lower part of the descending pipe and the lower filtration module shown in FIG. 1.

More specifically, as shown in FIG. 2, the aeration means (which is an agitation means 4 and also is a cleaning means) has a structure in which, for example, a plurality of aeration devices 4A, which are pipes or sintered tubes that have numerous air holes opened downward and are disposed beneath the filtration modules 3, are connected to an air supply source 4C such as a blower via an air pipe 4B that is used as an agitation fluid supply pipe or a cleaning fluid supply pipe. As a result, air A (see FIGS. 8 and 9) that is supplied from this air supply source 4C passes through the air pipe 4B and is blown out from air holes opened in the pipes of the aeration devices 4A or from fine pores formed in the sintered tubes, thus agitating the raw water W inside the casing 2 and cleaning the filtration modules 3 located above the aeration devices 4A by way of air-scrubbing made by the aeration.

The active carbon supply means 5 supplies a suspension containing 2 to 5% active carbon C to the interior of the casing 2 from a tank 5A via an active carbon supply pipe 5B, so that this active carbon C is added to the raw water W inside the casing 2. As shown in FIGS. 6 through 14, the position of the lower end of this active carbon supply pipe 5B which opens into the upper part of the inside of the casing 2 is set at a point lower than the upper end edge of the casing 2. It is desirable that the mean particle size of the active carbon C that is added be approximately 10 to 200 μm and that the amount of active carbon C that is added be approximately 10 to 100 mg per liter of raw water W. Instead of supplying a suspension of active carbon C as describe above, it is also possible to inject the active carbon C itself from above the casing 2, so that this active carbon C is added to the raw water W.

In the shown embodiment, furthermore, descending pipes 6A that extend downward from the introduction ports 2A are installed inside the casing 2. The lower-end openings 6B of the descending pipes 6A are positioned below the aeration devices 4A of the above-described aeration means used as agitation means 4 and cleaning means. With the descending pipes 6A, the above-described back flow prevention means 6 that prevents raw water W that has been introduced into the casing 2 from flowing back and being discharged into the water storage tank 11 from the introduction ports 2A is constructed.

Figure 3:
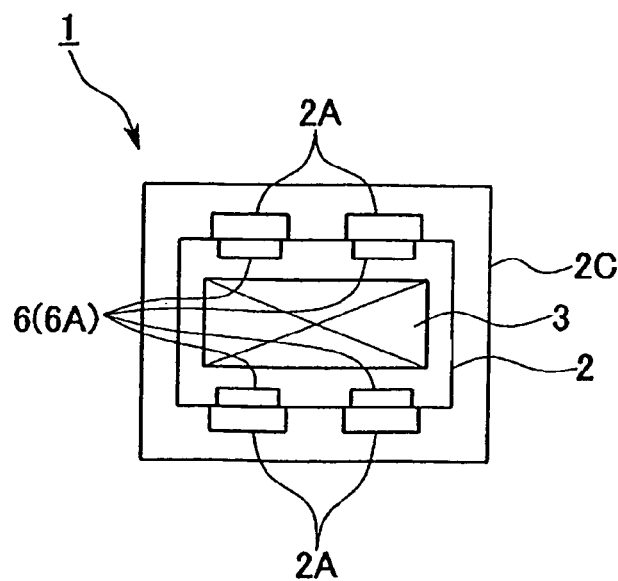
FIG. 3 is a top view of the filtration unit shown in FIG. 1.
Figure 4:
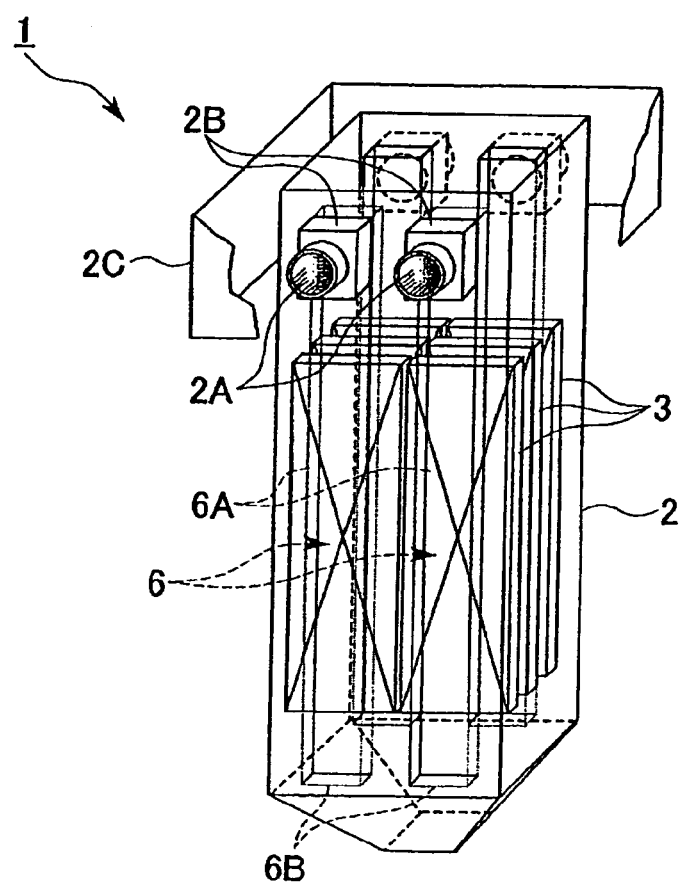
FIG. 4 is a partially cut-away see-through perspective view of a modification of the filtration unit of the embodiment shown in FIG. 1.

Here, in the descending pipes 6A, angle-type strip members that have a flattened "C" shape cross section are joined to the inside walls of the casing 2 in an area extending from the openings of the introduction ports 2A on the inside of the casing 2 to points located immediately above the bottom of the casing 2 (below the aeration devices 4A), and the open part of this cross section faces the corresponding inside wall of the casing 2 as shown in FIG. 3. The upper end portions of the descending pipes 6A are closed so that the introduction ports 2A communicate with the interiors of the descending pipes 6A as shown in FIGS. 6 through 14. The cross section of the descending pipes 6A in the water introduction part may also be semi-circular, or the descending pipes 6A may be pipes that run along the wall surfaces. There are no restrictions on the shape of the descending pipes 6A.

The discharge means 7 comprises a discharge pipe 7B that opens at one end thereof in the bottom of the casing 2 and is connected at another end thereof to a discharge suction pump 7A provided outside the casing 2. The discharge pipe 7B is provided so that the pipe extends from the discharge suction pump 7A side to a point directly above the casing 2 of the filtration unit 1 and then passes through the interior of the casing 2 in the above-described height direction from the opening in the upper part of this casing 2, with one end of the pipe opening in the bottom of this casing 2. The end portion of the discharge pipe 7B opens downward near the lower end of the inside bottom of the casing 2, which is in the shape of a truncated square pyramid protruding downward as described above.

The membrane filtered water pipe 3A of the filtration modules 3 and the air pipe 4B of the aeration means (agitation means 4 and cleaning means) also pass through the interior of the casing 2 from the opening in the upper part of this casing 2 in the same manner as the discharge pipe 7B, and they are connected to the headers of the filtration modules 3 or the aeration devices 4A.

An ultraviolet lamp may be installed inside the casing 2 so as to face the filtration modules 3. When an ultraviolet lamp is employed, a plurality of waterproofed fluorescent tube-form lamps, for instance, are supported in the gaps between the filtration modules 3 and the inside wall surfaces of the casing 2 or descending pipes 6A, or between adjacent descending pipes 6A, etc., along substantially the entire length of the filtration modules 3 in the above-described height direction of the casing 2 so that the direction of length of the respective lamps is oriented parallel to this height direction and so that the lamps are installed at substantially equal intervals in the above-described circumferential direction. The lamps are connected to a power supply and lit so that the filtration modules 3 are irradiated with ultraviolet light.

Next, one embodiment of the filtration apparatus of the present invention in which such filtration units 1 as described above are installed inside a water storage tank 11 will be described with reference to FIG. 5. An embodiment of the filtration unit installation method of the present invention that is used to install the filtration units 1 in this water storage tank 11 will also be described.

The water storage tank 11 in the filtration apparatus of this embodiment is, for example, a settling tank installed in an existing water cleaning plant; and this tank is formed so that the tank shows an oblong rectangular shape when seen from above or in a top view, and its direction of length is oriented in the left-right direction in FIG. 5.

This water storage tank 11 is comprised of a settling tank main body 12 and an overflow trough tank 13. The settling tank main body 12 has a shape of a pool which is formed so that the oblong shape extends downward "as is" to make the depth, and the overflow trough tank 13 is provided adjacent to one end (first end), which is the right side end in FIG. 5, of the settling tank main body 12 with respect to the above-described direction of length. In FIG. 5, the filtration units 1 are installed in both the settling tank main body 12 and the overflow trough tank 13. However, the filtration unit(s) 1 can be installed only in the settling tank main body 12 or only in the overflow trough tank 13.

On the opposite end (or a second end) of the settling tank main body 12 (with respect to the direction of length) from the overflow trough tank 13 (i.e., the left side end in FIG. 5), a flocculant mixing tank (not shown in the drawings) and a floc-forming tank 14 to which the raw water W that is introduced into the settling tank main body 12 is supplied are installed, so that these tanks are adjacent to the settling tank main body 12 with the end wall 12A on this second end of the settling tank main body 12 in between.

The above-described flocculant mixing tank can be supplied with flocculent, and a mixer is installed in this tank. The raw water W that is supplied to the flocculant mixing tank is agitated at a high speed by the mixer, so that this water is mixed with the flocculant. The raw water W mixed with flocculant then flows into the floc-forming tank 14. The floc-forming tank 14 is provided therein with a flocculator (not shown in the drawings) so that this flocculator is rotatable. The raw water W that flows into the floc-forming tank 14 after being mixed with flocculant in the flocculant mixing tank is agitated at a slower speed by the flocculator so that flocs that will readily precipitate are sufficiently formed, and this raw water W is then introduced into the settling tank main body 12 from the end wall 12A at the second end.

In the end wall 12A which is at the second end (with respect to the direction of length) of the settling tank main body 12 and is between the settling tank main body 12 and the floc-forming tank 14, numerous introduction holes 12B are formed in a lattice configuration or staggered configuration in the vertical and horizontal directions. The end wall 12A thus makes a flow adjusting wall.

The raw water W that is supplied to the floc-forming tank 14 is introduced into the settling tank main body 12 through the introduction holes 12B. The water level of the raw water W that is supplied to the settling tank main body 12 through the floc-forming tank 14 from the flocculant mixing tank is higher than the introduction holes 12B that are located at the highest positions in the end wall 12A. Thus, when the raw water W is held in the settling tank main body 12, the raw water W does not overflow from the floc-forming tank 14 into in the settling tank main body 12 and is supplied to the settling tank main body 12 from the second end with respect to the direction of length. The introduction holes 12B located at the lowest positions in the end wall 12A are sufficiently higher than the bottom 12C of the settling tank main body 12.

The settling tank main body 12 is formed in a substantially rectangular shape when seen from the side (or in a side view) as well; and it has longer sides in the above-described direction of length and is open at the top, as seen from FIG. 5. However, the bottom 12C, which is of the settling tank main body 12 and is at the second end, is formed so as to be lowered by one step, as shown in FIG. 5, to make a mud discharge pit 15. A mud discharge pipe (not shown in the drawings) which discharges mud M via a mud discharge valve (likewise not shown in the drawings) is connected to this mud discharge pit 15.

In addition, a mud scraping means 16 is installed in the bottom 12C of the settling tank main body 12. The mud scraping means 16 is movable in a direction of the longer sides of the rectangular shape of the settling tank main body 12 when seen from above or in a top view, especially in the movement direction F in the present embodiment, where the direction of the longer sides of the above-described rectangular shape (the above-described direction of length, i.e., the left-right direction in FIG. 5) is taken as this movement direction F.

Rails 16A are respectively provided so as to be parallel to the movement direction F (along the longer sides of the rectangular shape of the settling tank main body 12 when seen from above or in a top view) in the bottom 12C of the settling tank main body 12, and an underwater car 17 is provided so that the underwater car 17 car is movable on the rails 16A in the movement direction F. The underwater car 17 and rails 16A thus constitute the mud scraping means 16.

On both sides and both ends in the above-described direction of length, the underwater car 17 has wheels 17A that are placed on the rails 16A; and a scraper 17B, which extends in the direction of the shorter sides of the settling tank main body 12 so that this scraper does not interfere with the rails 16A, is attached to the bottom of the underwater car 17A.

As seen from FIG. 5, a wire rope 16B is disposed in the direction of length of the settling tank main body 12 (i.e., the movement direction F) directly above the running path of the underwater car 17, and the wire rope 16B is connected to the underwater car 17. The wire rope 16B is wound around pulleys 16C, which are attached to the bottom 12C of the settling tank main body 12 at both ends in the direction of length, and is mounted on a rope winding means (not shown in the drawings) disposed on a slab on the second end of the settling tank main body 12. By way of winding up and releasing the wire rope 16B by the rope winding means, the wire ripe 16B installed in the direction of length of the bottom 12C of the settling tank main body 12 is caused to advance and retract in the movement direction F, so that the underwater car 17 makes a reciprocating motion in the movement direction F.

In the shown embodiment, a plurality of sets of the mud scraping means 16 and underwater cars 17 are provided in the bottom 12C of the settling tank main body 12 so that the shorter sides of the bottom in the rectangular shape seen in a top view are divided into equal parts; and a plurality of sets of the rope winding means that respectively drive (winds up and releases) the wire ropes 16B of the mud scraping means 16 are installed on the slab. In this case, the driving units that drive the rope winding means may be provided for each rope winding means so that the underwater cars 17 are moved independently. A plurality of sets (e.g., two sets) of rope winding means can be thus driven by a single driving unit so that when one underwater car 17 is moved in one direction of the reciprocating motion in the movement direction F, the other underwater car 17 is moved in the other (opposite) direction of this reciprocating motion.

As described above, the underwater cars 17 are movable in the direction of the longer sides of the oblong rectangular shape of the settling tank main body 12. However, in cases where the length of the shorter sides of the rectangular shape of this settling tank main body 12 is long enough, then it is possible to install a plurality of pairs of rails 16A in the direction of the shorter sides, install a plurality of underwater cars 17, and install mud scraping means 16, so that the direction of the shorter sides is taken as the movement direction F.

The underwater cars 17 are connected to the wire ropes 16B so that the scrapers 17B of the underwater cars 17 move in linkage with the reciprocating motion that accompanies the advancing and retraction motion of the wire ropes 16B in the movement direction F.

More specifically, when the portion of each wire rope 16B that is connected to the corresponding underwater car 17 advances toward the second end (left side end in FIG. 5) of the settling tank main body 12 with respect to the direction of length (in the movement direction F), and the underwater car 17 is accordingly moved in one direction of the reciprocating motion toward the mud discharge pit 15 at this second end in the direction of length (in the movement direction F), the corresponding scraper 17B is lowered from the underwater car 17 and is placed so that the scraper makes sliding contact with the bottom 12C of the settling tank main body 12 or is positioned in close proximity to this bottom 12C. As a result, the mud that has accumulated in the bottom 12C is scraped by the moving underwater car 17 in the above-described direction and dropped into the mud discharge pit 15. Conversely, when the portion of each wire rope 16B that is connected to the corresponding underwater car 17 is retracted toward the first end, and the underwater car 17 is moved in the other direction of the reciprocating motion that is opposite to the above-described first direction (in the movement direction F), the scraper 17B is raised to be separated from the bottom 12C of the settling tank main body 12, so that the accumulated mud M is not taken up.

Furthermore, numerous inclined plates 18, which are inclined with respect to the horizontal plane and are stacked with an appropriate spacing, are provided in the upper part of the interior of the settling tank main body 12 that has the mud scraping means 16 in the bottom 12C. The inclined plates 18 are for promoting the precipitation of flocs. Inclined pipes can be employed instead. In cases where there is a sufficient length in the direction of flow in the settling tank, and a sufficient precipitation time is obtained, then such inclined plates are not required.

The overflow trough tank 13 is in a rectangular shape (oblong shape) that extends along the shorter side at the first end of the rectangular shape of the settling tank main body 12 when viewed from above. The width of the overflow trough tank 13 in the direction of length is set at a smaller value than the settling tank main body 12. The overflow trough tank 13 is smaller in depth (thus shallower) than the settling tank main body 12.

The overflow trough tank 13 is provided next to the settling tank main body 12 with the partition wall 12D in between at the first end (with respect to the direction of length) of the settling tank main body 12. Numerous introduction holes 12E are formed in a lattice configuration or staggered configuration in the vertical and horizontal directions (in the same manner as in the end wall 12A at the second end) in the partition wall 12D. Relatively clean raw water W, which has been introduced into the settling tank main body 12 of the water storage tank 11 from the floc-forming tank 14 and from which the major portion of the mud M has been separated by precipitation as described above, is introduced into the overflow trough tank 13 through the introduction holes 12E.

Between the partition wall 12D and the inclined plates 18 inside the settling tank main body 12, a space is provided. An overflow trough (not shown in the drawings) is provided in the overflow trough tank 13, and the supernatant of the inflowing water flows out from this overflow trough.

In the shown embodiment, a plurality of the filtration units 1 which have the same size, same shape and same structure are provided in the settling tank main body 12 and overflow trough tank 13, so that the bottoms of the casings 2 of the filtration units 1 face downward, and the height direction of the casings 2 is oriented in the vertical direction and the filtration units 1 are immersed in the raw water W that is introduced into the settling tank main body 12 and overflow trough tank 13. In the settling tank main body 12, the filtration units 1 are disposed between the inclined plates 18 and partition wall 12D; and such filtration units 1 that are in a rectangular shape when viewed from above (in a top view) are disposed so that their sides are set parallel to each other. The filtration units 1 are installed also with gaps formed between the filtration units 1 and the inside walls of both the settling tank main body 12 (including the partition wall 12D) and the overflow trough tank 13. When necessary, the filtration units 1 are lined up in the (width) direction in which the overflow trough tank 13 extends (i.e., in the direction perpendicular to the drawing sheet of FIG. 5).

Accordingly, when seen from above or in a top view, the filtration units 1 are disposed on one side (first side) of the settling tank main body 12 which is the opposite side from the end wall 12A where the raw water W is introduced into the water storage tank 111 of the filtration apparatus. The inclined plates 18 of the settling tank main body 12 are disposed between the filtration units 1 and the end wall 12A which is on the second end where the raw water W is introduced into the water storage tank 11. The above-described overflow trough is not used when the filtration units are installed in the overflow trough tank 13.

The filtration units 1 are provided at the same height in their vertical direction. In other words, with gaps being formed between the filtration units 1 and the bottom 12C of the settling tank main body 12 and also between the filtration units 1 and the bottom 13A of the overflow trough tank 13, the casings 2 and partition plates 2C of the filtration units 1 are suspended by, for example, wire ropes that extend from a frame installed over the settling tank main body 12 and overflow trough tank 13. It is also possible that the casings 2 and partition plates 2C of the filtration units 1 be suspended by being directly attached to a frame consisting of angle members, etc., which are disposed inside the settling tank main body 12 and overflow trough tank 13. For each one of the filtration units 1, it is possible that the casing 2 is supported by a wire rope or a frame as described above and the partition plate 2C is supported by the casing 2 or vice versa.

The filtration modules 3 and cleaning means 4 that are accommodated inside the casings 2 can be likewise supported by being suspended by wire ropes, etc., from a frame that is installed over the settling tank main body 12 and over the overflow trough tank 13 or by being directly attached to brackets, etc., that are disposed inside the casings 2.

As to the upper portions of the casings 2 of the filtration units 1 that are thus supported, the upper end edges of the casings 2 and partition plates 2C are positioned so that they are above the water level, i.e., above the water surface H, of the raw water W that is introduced into the settling tank main body 12 and overflow trough tank 13 as described above (as shown in FIGS. 6 through 14), and so that the lower end edges of the partition plates 2C are positioned below the water surface H. The lower end edges of the introduction ports 2A of the casings 2 are positioned below the water surface H, and the introduction ports 2A open into this water surface H. In particular, in the shown embodiment, the introduction ports 2A are positioned and opened at substantially the same height as the water surface H of the raw water W as shown in FIG. 6.

In the filtration apparatus in which the filtration units 1 are thus installed inside the water storage tank 11, raw water W passing through the floc-forming tank 14 from the flocculant mixing tank is introduced into the settling tank main body 12 of the filtration apparatus through the introduction holes 12B of the end wall 12A on the second end as described above. While the raw water W moves toward the first end (with respect to the above-described direction of length) of the rectangular shape settling tank main body 12, most of the flocs of mud M, etc. are precipitated and separated by the inclined plates 18 so that the flocs are deposited in the bottom 12C, thus producing relatively clear raw water W. Moreover, the mud M that has thus been deposited in the bottom 12C is scraped into the mud discharge pit 15 at the second end by the underwater car(s) 17 of the mud scraping means 16 and discharged.

The raw water W that has thus been clarified is then filtered by the filtration units 1 disposed at the first end of the settling tank main body 12. Furthermore, the raw water W that is introduced into the overflow trough tank 13 through the introduction holes 12E of the partition wall 12D at this first end is filtered by the filtration unit 1 installed in this overflow trough tank 13.

Figure 6:
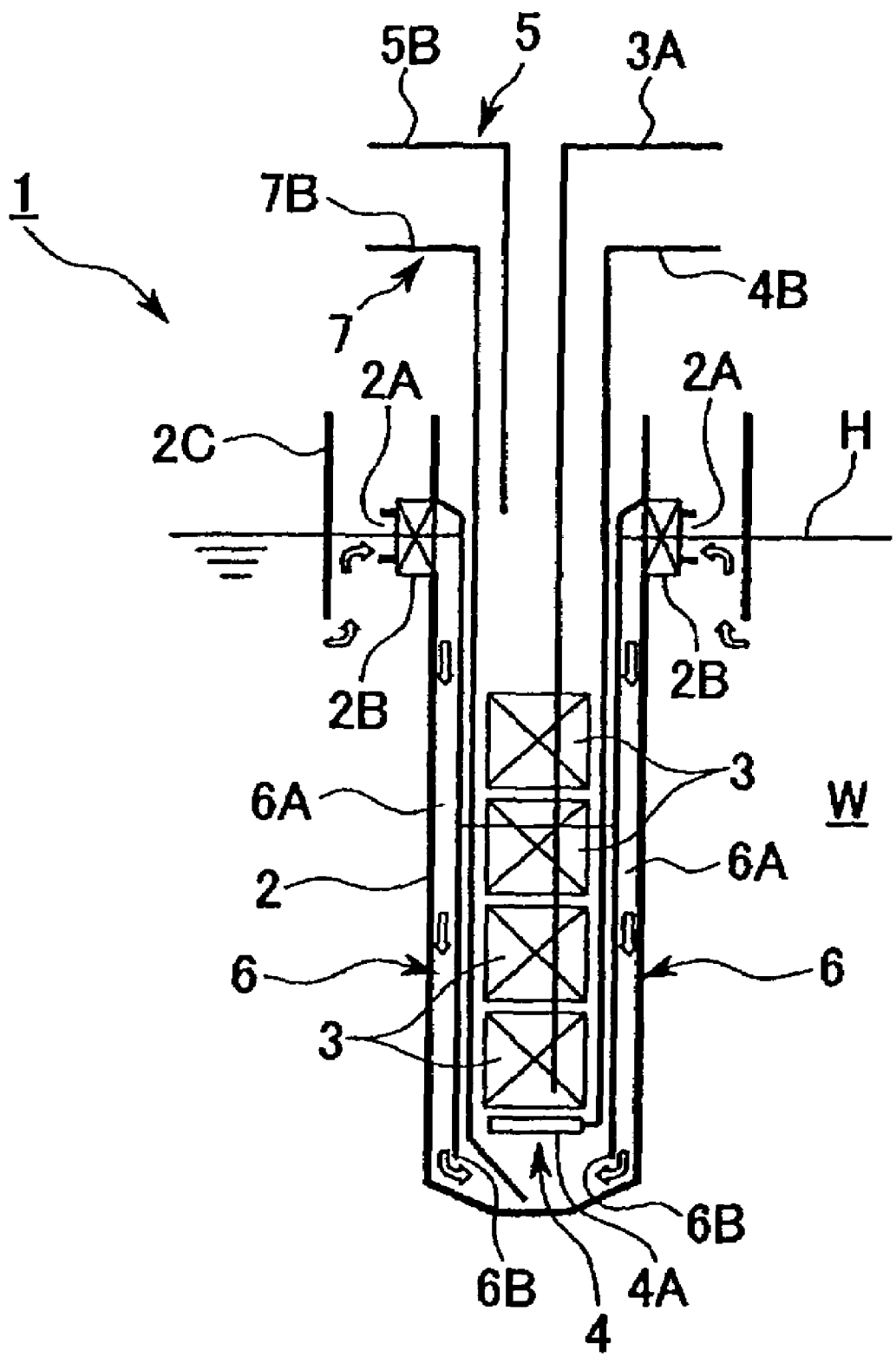
FIG. 6 shows, in cross-section, the introduction of raw water in the filtration method that uses the filtration unit shown in FIG. 1.

More specifically, during the filtration operation that is performed in the filtration units 1, the opening-and-closing valves used as the control means 2B are first opened so that the introduction ports 2A are opened as shown in FIG. 6, and the raw water W inside the water storage tank 11 passes through the introduction ports 2A and is introduced into the casings 2 since the introduction ports 2A are formed so that the introduction ports 2A can open into the water surface H of the raw water W.

Figure 7:
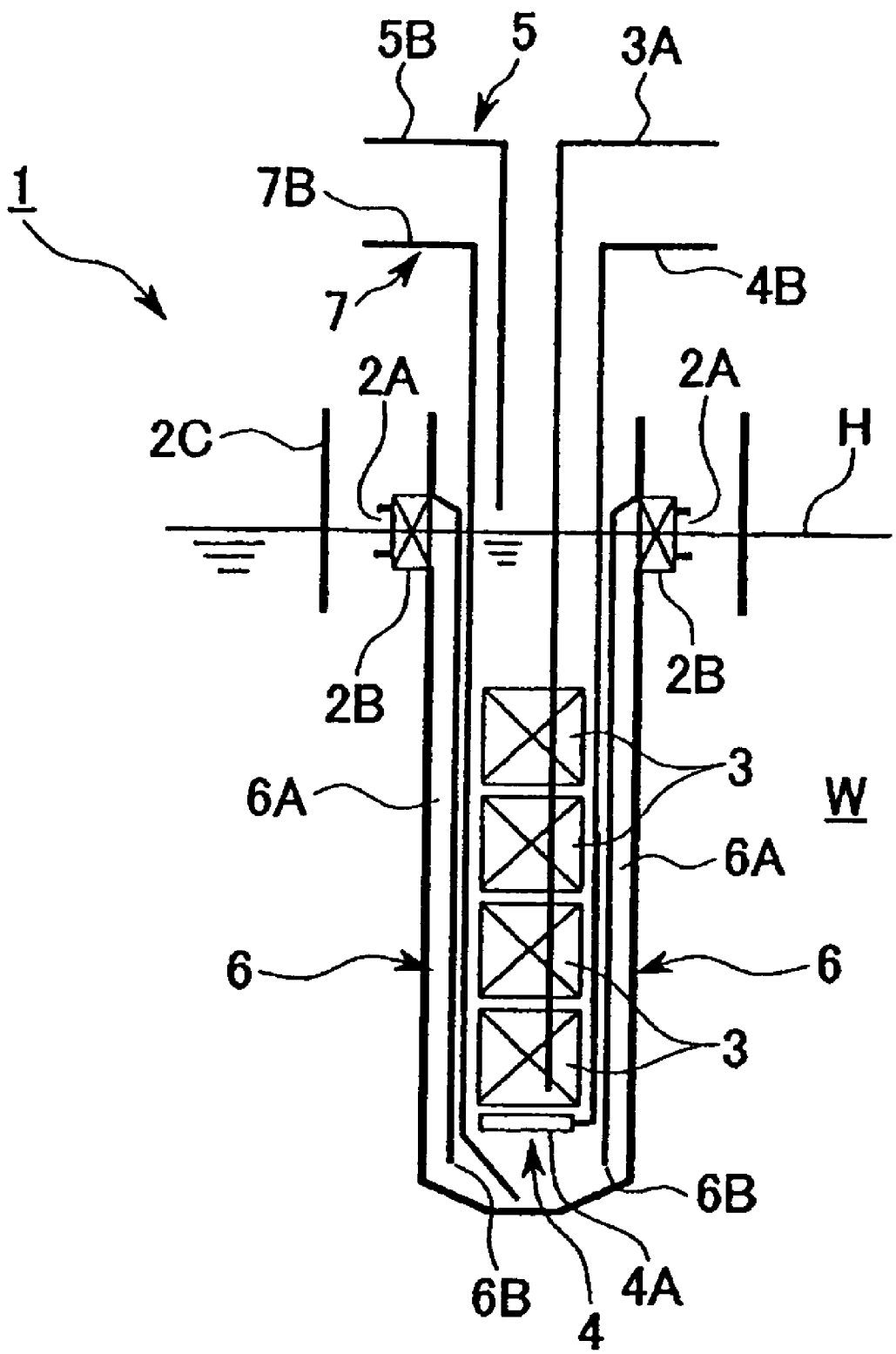
FIG. 7 shows, in cross-section, the full water state in the filtration method that uses the filtration unit shown in FIG. 1.

However, the openings of the introduction ports 2A inside the casings 2 are covered by the descending pipes 6A of the back flow prevention means 6. Thus, the raw water W that is introduced through the introduction ports 2A passes through the interiors of the descending pipes 6A and then flows into the interior of the casings 2 (located further to the inside than the descending pipes 6A) from the lower-end openings 6B of the descending pipes 6A located in the bottoms of the casings 2, and the interiors of the casings 2 are filled with this raw water W. The introduction of raw water W reaches equilibrium and is completed when the water level of the raw water W inside the casings 2 becomes equal to the water level of the water surface H of the raw water W in the water storage tank 11 as shown in FIG. 7.

Figure 8:
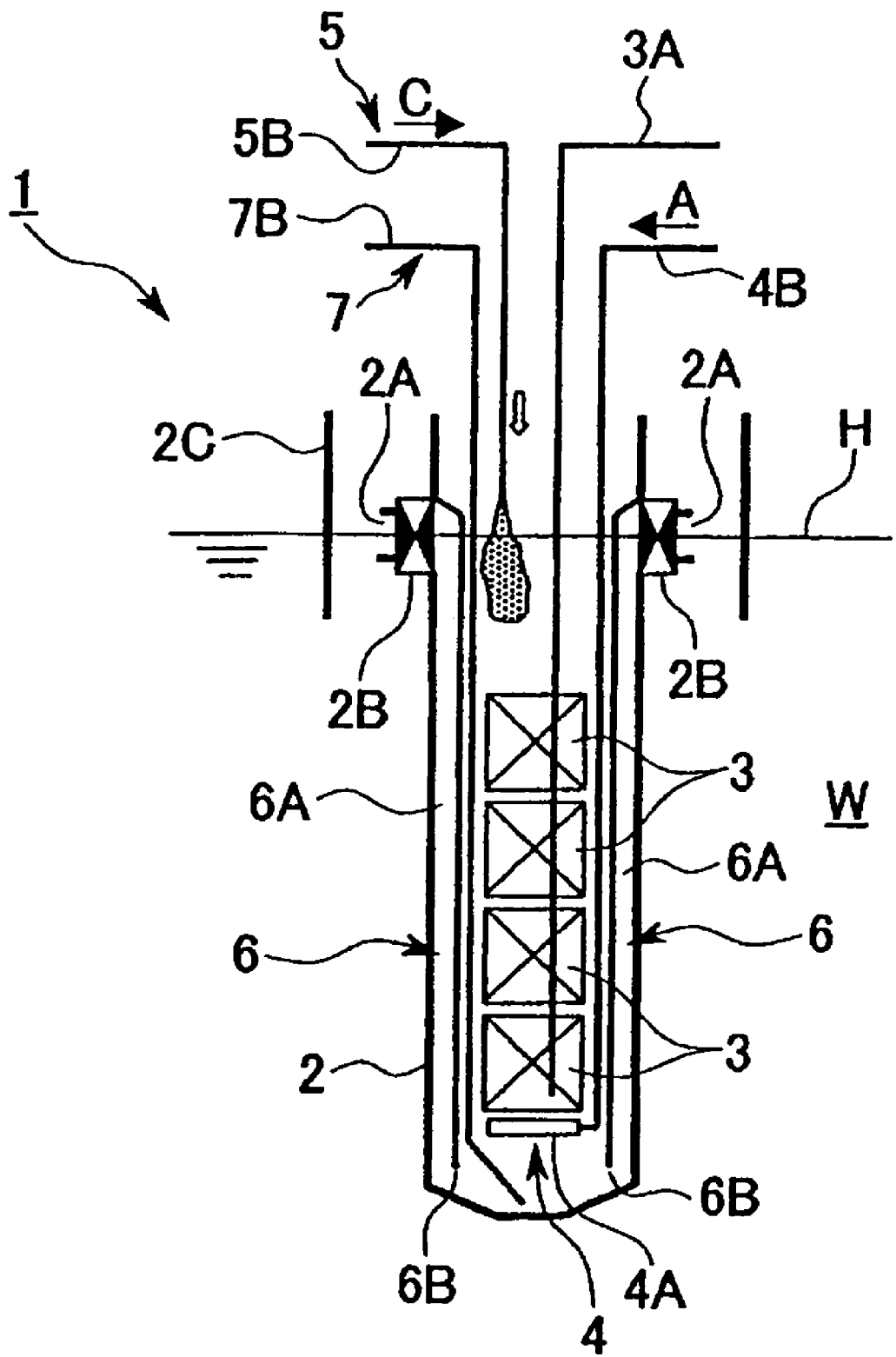
FIG. 8 shows, in cross-section, the addition of the active carbon C in the filtration method that uses the filtration unit shown in FIG. 1.

Next, as seen from FIG. 8, active carbon C (a suspension of active carbon C in the shown embodiment) is supplied by the active carbon supply means 5 to the raw water W that has thus been introduced in the casings 2. In this case, the introduction ports 2A are closed by the control means 2B, and a control is made so that the flow of raw water W into or out of the casings 2 through the introduction ports 2A is blocked.

Figure 9:
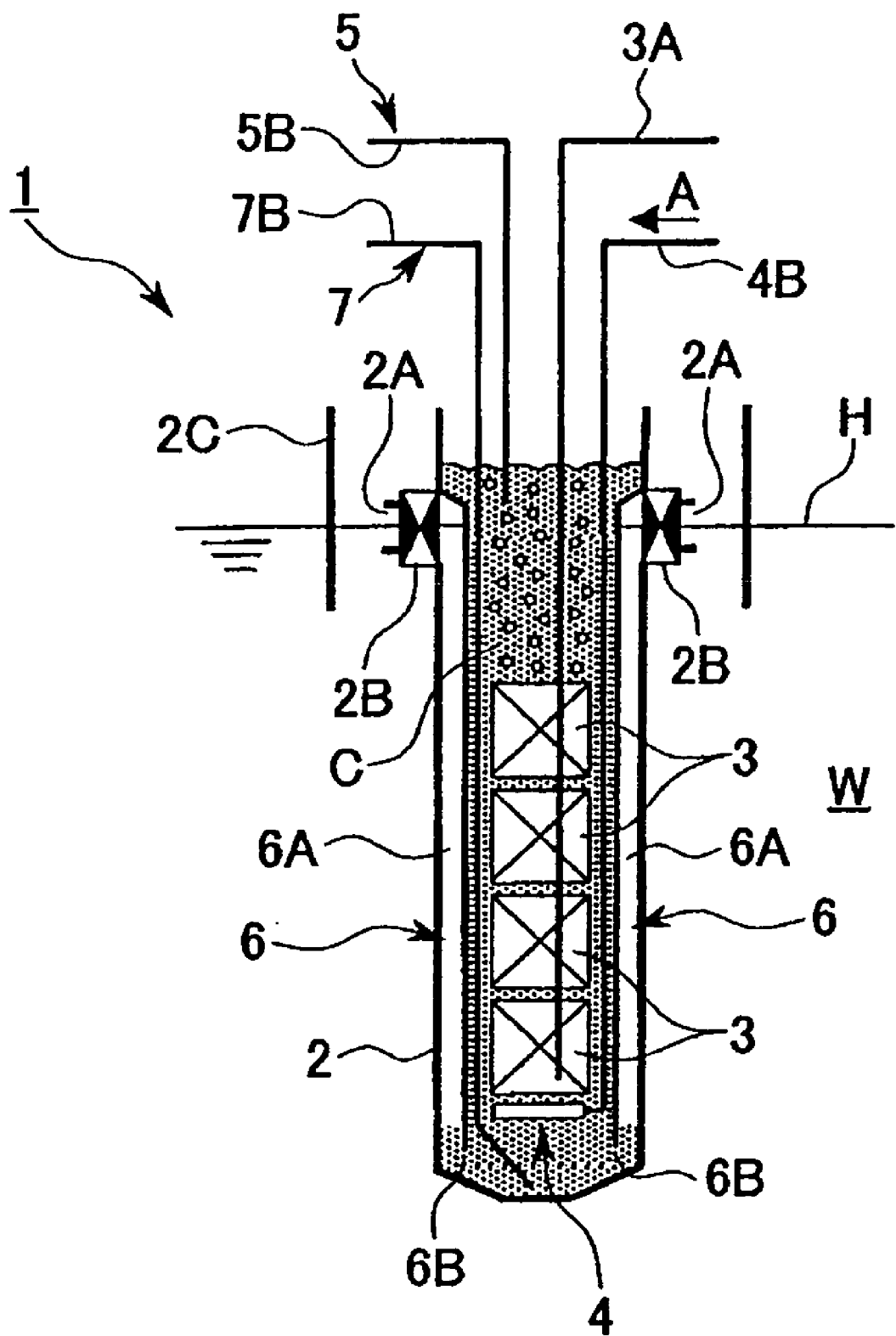
FIG. 9 shows, in cross-section, the agitation of the raw water W in the filtration method that uses the filtration unit shown in FIG. 1.

Afterward, as seen from FIG. 9, the raw water W inside the casings 2 to which active carbon C has been added is agitated by the aeration means used as the agitation means 4, as a result of air A being caused to jet from the aeration devices 4A as an agitating fluid, so that the active carbon C is uniformly dispersed in the raw water W. The introduction ports 2A are still kept closed by the control means 2B during this period as well.

Figure 10:
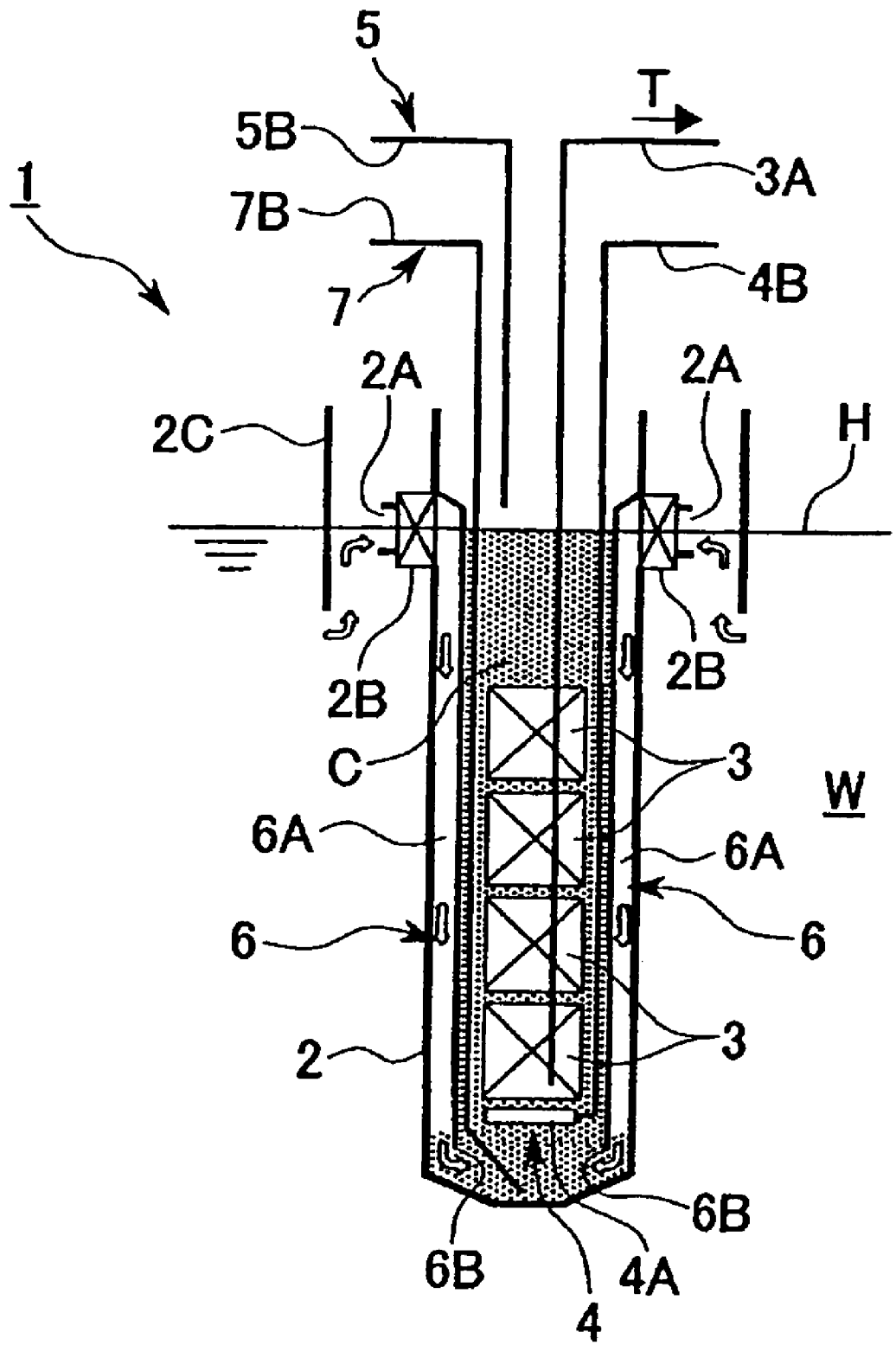
FIG. 10 shows, in cross-section, the filtration operation in the filtration method that uses the filtration unit shown in FIG. 1.

When the raw water W inside the casings 2 has thus been agitated, the filtration suction pump 3B connected to the filtration modules 3 is driven, so that the filtration modules 3 filters the raw water W is filtered as shown in FIG. 10. In this case, organic matter, etc., that is mixed with the raw water W is adsorbed by the active carbon C that has been added to this raw water W; and as a result of filtration by suction, the active carbon C itself also adheres to the surfaces of the hollow filament membranes, etc., that constitute the filtration modules 3, and forms a layer on the surfaces as shown in FIG. 11.

When a layer of active carbon C is thus formed and filtration is performed, turbid matter such as mud is filtered by this layer, so that the load on the membranes is reduced. Small particles of such turbid matter that pass through the active carbon layer are filtered by the membranes; and as a result, clear raw water W alone is discharged and recovered as filtered water T.

Figure 11:
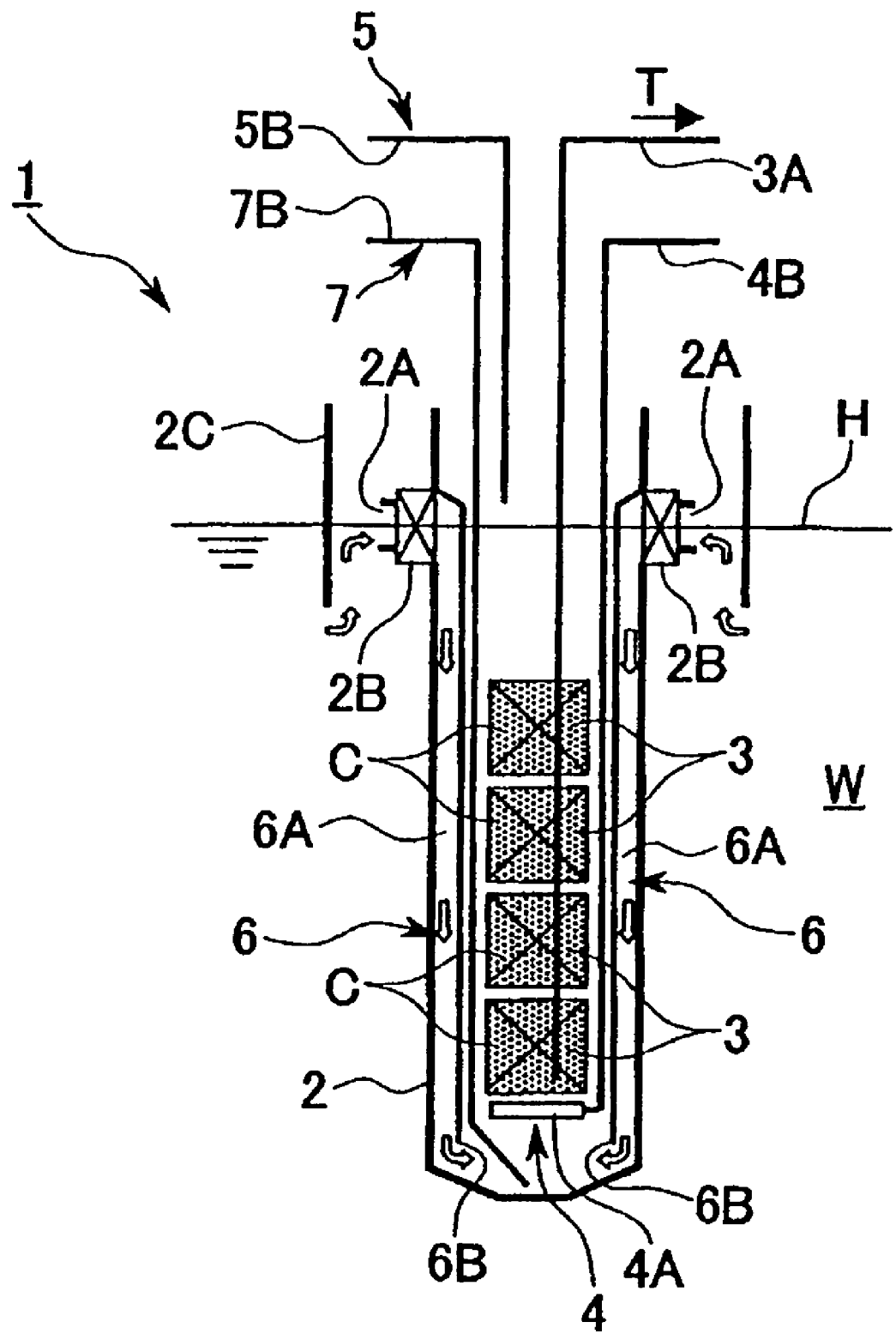
FIG. 11 shows, in cross-section, a state in which active carbon has been adsorbed on the surface of the filtration module during the filtration operation in the filtration method that uses the filtration unit shown in FIG. 1.

During the above filtration of the raw water W by the filtration modules 3, as shown in FIGS. 10 and 11, the introduction ports 2A are opened by the control means 2B, so that the flow of raw water W through the introduction ports 2A is allowed. Consequently, when the raw water W is filtered by the filtration modules 3 and clear water T is discharged, a pressure difference is generated in the raw water W between the insides and outsides of the casings 2 as the water level of the raw water T inside the casings 2 tends to fall below the water level of the raw water W in the water storage tank 11. As a result, the raw water W flows into the interiors of the casings 2 through the introduction ports 2A as shown by white arrows, so that a continuous filtration operation of the raw water W is performed.

When such continuous filtration is performed, the surfaces of the layers of active carbon C on the surfaces of the filtration modules 3 would be covered by organic matter, etc., and the filtration efficiency of the layers of active carbon C in newly introduced raw water W would drop. In this situation, such a filtration operation is performed that agitation is performed by the agitation means 4 after temporarily closing the introduction ports by the control means 2B, thus returning the filtering cycle to the state shown in FIG. 9, and then the active carbon C is again dispersed, so that the process shown in FIGS. 9 through 11 is repeated. During the agitation, the suction in the membranes created by the filtration suction pump 3B is stopped.

Figure 13:
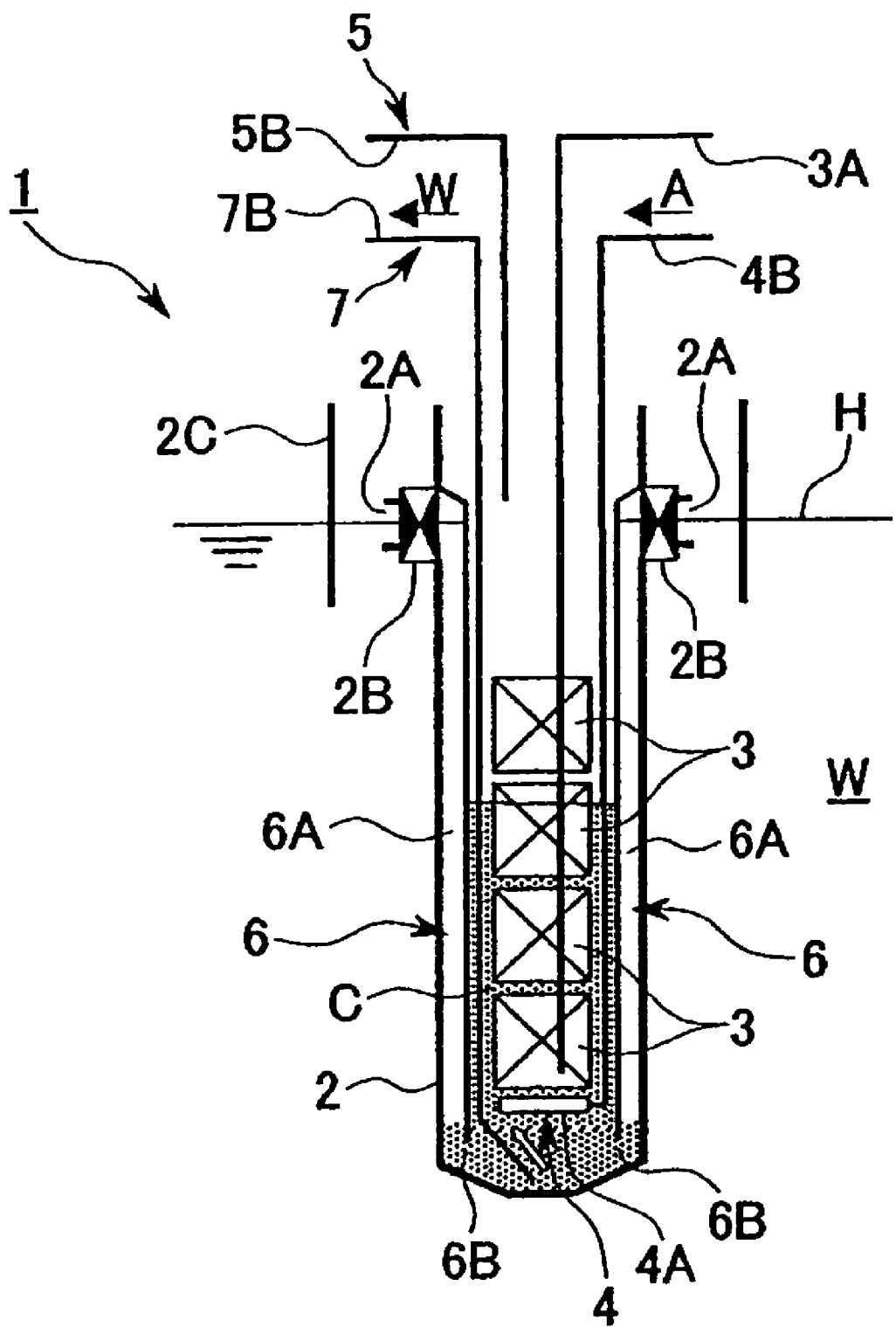
FIG. 13 shows, in cross-section, the discharge of the raw water W following cleaning in the filtration method that uses the filtration unit shown in FIG. 1.
Figure 14:
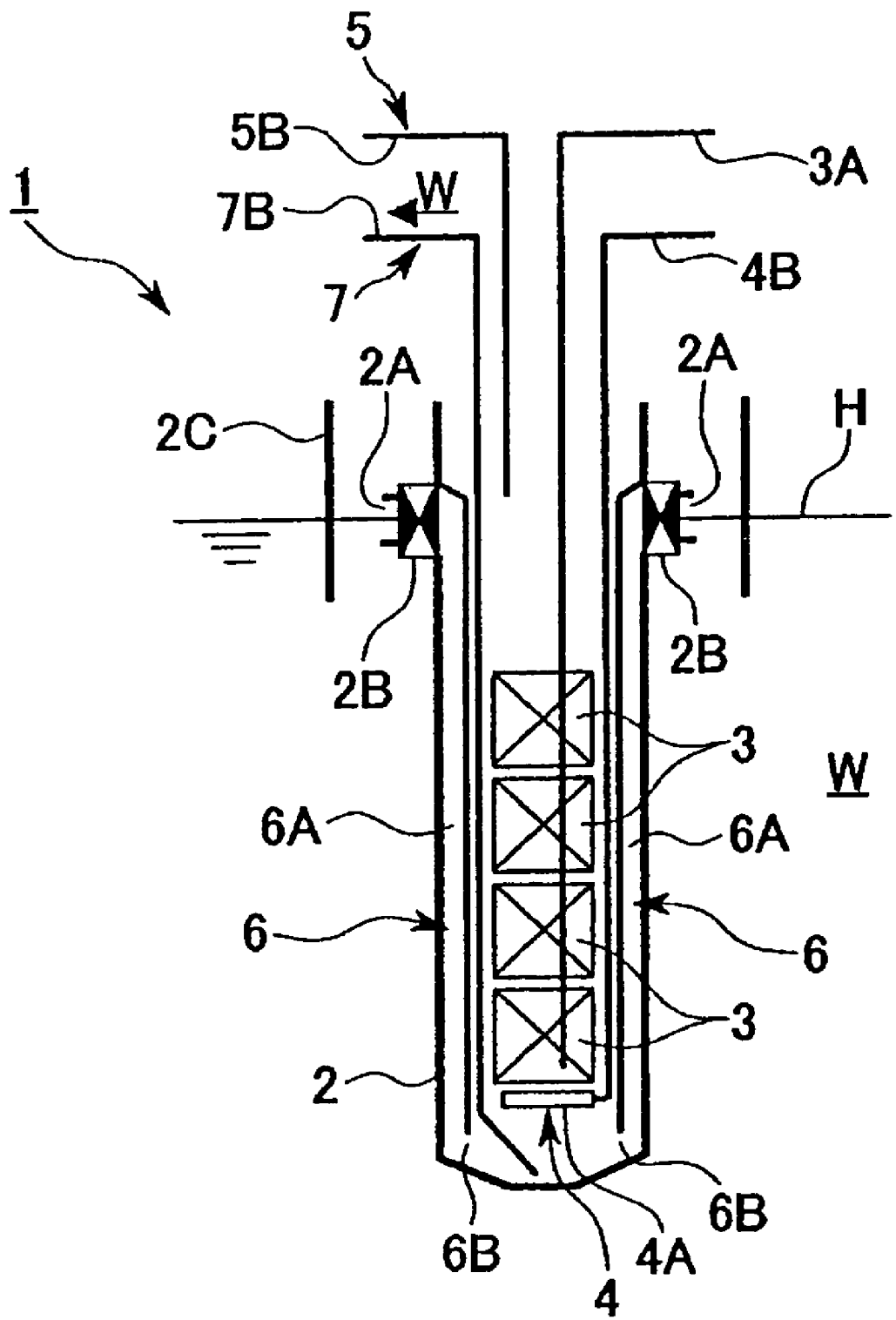
FIG. 14 shows, in cross-section, the completion of discharge of the raw water W following cleaning in the filtration method that uses the filtration unit shown in FIG. 1.

In cases where the adsorption capacity of the active carbon is surpassed by the mud or organic matter in the raw water W while such a filtration operation is being performed, then the active carbon is discharged after agitation is performed by the agitation means 4 installed in the filtration units 1, and fresh active carbon is introduced. In other words, as shown in FIG. 9, the suction and discharge of the filtered water T by the filtration suction pump 3B is stopped, and the flow of raw water W through the introduction ports 2A is cut off by closing the opening-and-closing valves of the control means 2B, air A is next spread from the aeration devices 4A of the aeration means, so that adhering matter such as the active carbon C, mud and microscopic particles of turbid matter adhering to the filtration modules 3 is stripped by air scrubbing. The raw water W is, along with this stripped adhering matter, discharged by the discharge means 7. The water level of the raw water W inside the casings 2 is gradually lowered as shown in FIG. 13, until this water level is eventually caused to fall below the lower ends of the discharge pipes 7B as shown in FIG. 14, whereupon the discharge finishes. Air scrubbing can be continued during the discharge of the raw water. Subsequently, raw water and active carbon are again introduced, and operation is started.

When such a filtration operation is further performed, a filtration efficiency drop would occur by the microscopic particles of turbid matter in the raw water W that adheres to the surfaces of the hollow filament membranes, etc., of the filtration modules 3, and by the load increase on the filtration modules. In this situations cleaning of the filtration modules 3 is performed by the cleaning means that is also used as the agitation means 4 installed in the filtration units 1.

Figure 12:
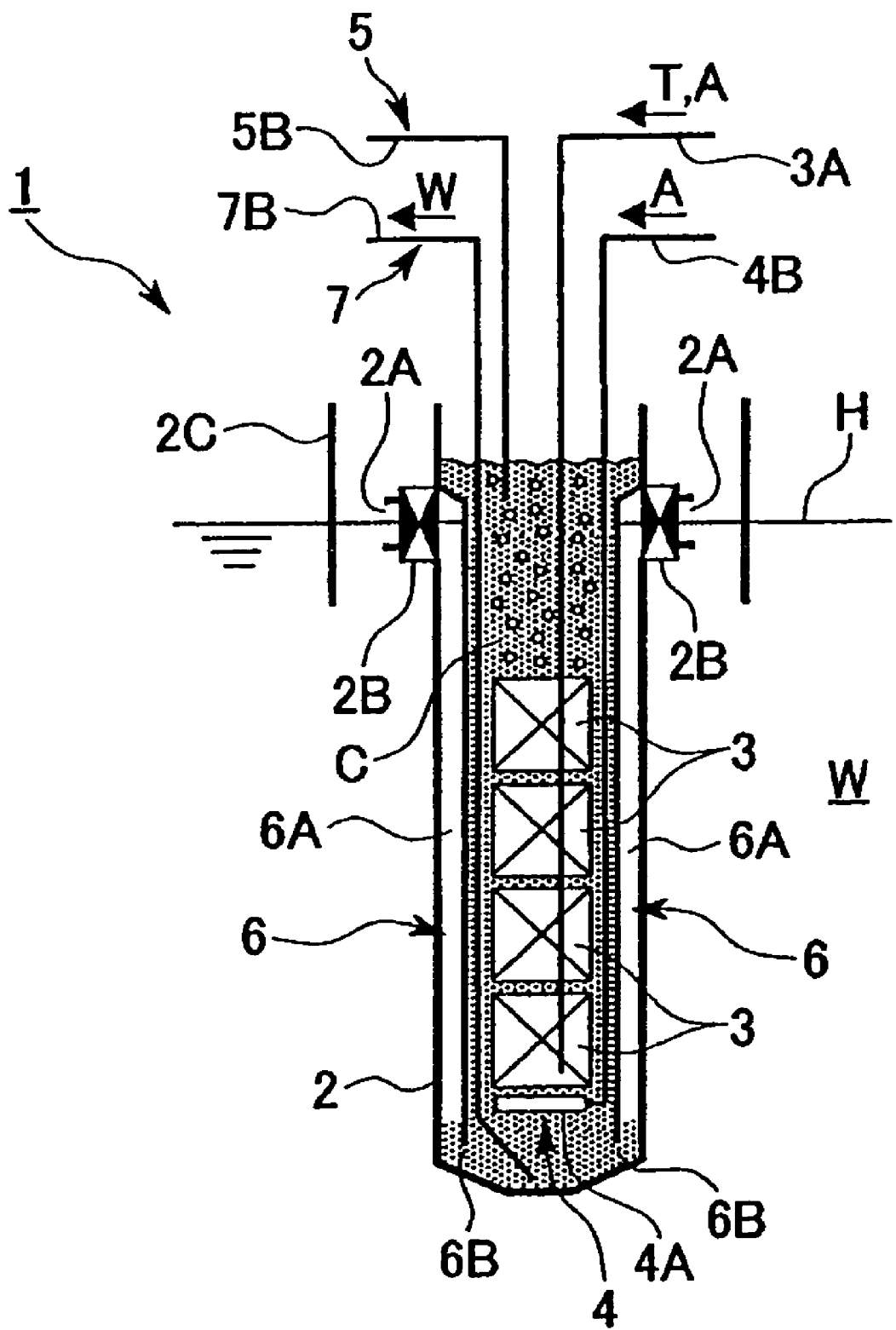
FIG. 12 shows, in cross-section, the cleaning of the filtration module in the filtration method that uses the filtration unit shown in FIG. 1.

In other words, as shown in FIG. 12, the suction and discharge of the filtered water T by the filtration suction pump 3B is stopped, and the flow of raw water W through the introduction ports 2A is cut off by the closing of the opening-and-closing valves of the control means 2B, air A is next spread from the aeration devices 4A of the aeration means, and the adhering matter such as the active carbon C, mud and microscopic particles of turbid matter adhering to the filtration modules 3 is stripped by air scrubbing. Furthermore, reverse washing is applied by supplying air or filtered water produced by the filtration modules 3 via the membrane filtered water pipes 3A. The water inside the casings 2 increases by this reverse washing. Thus, the raw water W inside the casings 2 is appropriately sucked in by the discharge means 7 and discharged so that water does not overflow from the casings 2.

After the filtration modules 3 have thus been cleaned by the cleaning means and the adhering matter is stripped away, reverse washing is stopped. The raw water W is, together with this stripped adhering matter, discharged by the discharge means 7. The water level of the raw water W inside the casings 2 gradually decreases as shown in FIG. 13, until this water level is eventually caused to fall below the lower ends of the discharge pipes 7B as shown in FIG. 14, whereupon the discharge finishes. Air scrubbing may be continued during the discharge of the raw water. Subsequently, raw water and active carbon are again introduced, and operation is started.

The discharged raw water W is recovered in a wastewater treatment facility. In some cases, however, this raw water may be supplied to the flocculant mixing tank on the opposite side from the filtration units 1 in the water storage tank 11, and solid matter may again be precipitated as flocs.

As seen from the above, the filtration units 1 constructed as described above are installed in a manner that such casings 2 are immersed in the settling tank main body 12 and overflow trough tank 13 in the water storage tank 11 such as a settling tank in a water cleaning plant. Accordingly, the required space does not exceed the size of the water storage tank 11, and space can be saved. Furthermore, since the filtration modules 3 and agitation means (cleaning means) 4 are accommodated inside the casings 2 that are substantially tubular in shape and have bottoms, even if, for example, the aeration means is used as the agitation means (cleaning means) 4, and agitation and cleaning are accomplished by spreading air A as in the above embodiment, the raw water W held inside the water storage tank 11 which is outside the casings 2 is not agitated. Accordingly, mud deposited in the bottoms 12C and 13A of this water storage tank 11 is prevented from rolling up; and there is likewise no introduction of the rolling up mud, etc., into the casings 2 along with the raw water W following the agitation or following the cleaning. As a result, a high-speed filtration operation can be performed, greatly improving the working efficiency.

In addition, since the active carbon supply means 5 is provided in the filtration units 1, and active carbon C is added to the raw water W that is introduced into the casings 2, organic matter, etc., contained in the raw water W can be adsorbed by this active carbon C. Furthermore, mud, etc., can be separated as a result of the active carbon C that forms a layer on the surfaces of the filtration modules 3, so that only microscopic particles of turbid matter are separated by the hollow filament membranes, etc., of the filtration modules 3. Efficient filtration can be thus achieved.

Moreover, in the above-described installation method and filtration apparatus, since the filtration units 1 are installed inside the water storage tank 11 such as a settling tank, the casing 2 of each filtration unit 1 is small; and since relatively clear raw water W is introduced into the casings 2, the amount of active carbon C that is added can be conspicuously smaller than the amount required in cases where such active carbon is added to tanks (the water storage tank 11 in the above embodiment) into which the raw water is introduced as in Japanese Patent Application Laid-Open (Kokai) No. H9-24250 and Japanese Patent No. 3440402. Moreover, since the amount of mud, etc., contained in the raw water W that is discharged by the discharge means 7 is small, the raw water W can be recycled into the pre-stage of the filtration units 1, and the active carbon C can be re-utilized. Accordingly, the system is economical, and the cost of filtration is low.

In the filtration unit 1, the back flow prevention means 6, which prevents the raw water W that has been introduced into the casings 2 from flowing back to the introduction ports 2A and being discharged into the water storage tank 11, is provided. Accordingly, when the introduction ports 2A are opened after the raw water W to which active carbon C was added has been agitated by the agitation means 4, and filtration is continuously performed by the filtration modules 3 while introducing raw water W into the water storage tank 11, it is possible to prevent such a situation that efficient filtration by the active carbon C is hindered as a result of raw water W that contains active carbon C inside the casings 2 being discharged into the water storage tank 11 from the introduction ports 2A, and it is also possible to prevent such a situation that the reduction of the cost of filtration is diminished as a result of the need to supply fresh active carbon C from the active carbon supply means 5 in order to make up for the active carbon C that is discharged. In other words, in the filtration unit 1 as described above, and the installation method and filtration apparatus that uses this filtration unit, the effects of improving the filtration efficiency and reducing the cost that are obtained by adding such active carbon C can be manifested much more certainly as a result of the use of the back flow prevention means 6.

In the above embodiment, the descending pipes 6, which extend downward inside the casings 2 from the introduction ports 2A and whose lower-end openings 6B are positioned below the aeration devices 4A of the agitation means 4, are used as the back flow prevention means 6, so that the raw water W is agitated mainly in the area above the agitation means 4, and the back flow of this raw water W toward the introduction ports 2A is thus more securely prevented. Furthermore, the tubular members such as common pipes may be disposed as the descending pipes 6A so that the tubular members are oriented downward from the openings of the introduction ports 2A on the insides of the casings 2 and open below the agitation means 4. However, if it is devised so that strip members with a C-shaped cross-sectional shape that are open on one side are joined to the inside walls of the casings 2 so that descending pipes 6A are formed in a tubular shape together with the casings 2 as in the present embodiment, the following advantages are obtainable. Namely, the formation of a dead space in which an agitating effect is not sufficiently exerted in the spaces between the tubular members and the inside walls of the casings 2, etc., in cases where such tubular members are installed can be prevented, and a large space used for filtration can be ensured inside the casings 2.

In the above embodiment, an aeration means that agitates the raw water W by jetting and spreading air A from the aeration devices 4A are used as the agitation means 4; and this aeration means is used as a cleaning means during the cleaning of the filtration modules 3 so as to strip away that adhering matter, etc., adhering to the filtration modules 3 by air scrubbing. Thus, much more effective operation is accomplished. It is also possible to employ a structure in which the agitation means 4 is not also used as the cleaning means in this way and in which, for example, the agitation means disperses the added active carbon C by agitating the raw water W by means of rotating agitating vanes. Furthermore, it is also possible in the present invention to install pipes having holes or sintered pipes similar to such aeration pipes above the lower-end openings 6B of the descending pipes 6A or on the filtration modules 3 side within the casings 2 and to supply raw water W or clear water that is pressurized to the pipes, thus agitating the raw water inside the casings 2 or cleaning the filtration modules 3 by a water jet flow.

Furthermore, in the shown embodiment, the flow of raw water W through the introduction ports 2A of the casings 2 is controlled by the control means 2B. Accordingly, even if the raw water W inside the casings 2 to which active carbon C has been added should flow back toward the introduction ports 2A during agitation in spite of the back flow prevention means 6, the discharge of this raw water W into the water storage tank 11 is prevented. Furthermore, the introduction ports 2A are also closed off by closing the opening-and-closing valves of the control means 2B during the cleaning of the filtration modules 3. Accordingly, a state in which the raw water W inside the casings 2 and the raw water W inside the water storage tank 11 outside are isolated from each other can be obtained. Accordingly, even if the water level of the raw water W inside the casings 2 rises as a result of the air scrubbing performed by the aeration means as shown in FIG. 12, a situation can be avoided in which adhering matter stripped from the filtration modules 3 by cleaning is discharged into the water storage tank 11 from the introduction ports 2A, and this matter is again introduced into the casings 2 from the introduction ports 2A when filtration work is re-started, so that such matter adheres to the filtration modules 3. Accordingly, in the shown embodiment, a drop in the filtration efficiency following cleaning caused by the re-adhesion of the such stripped adhering matter is prevented, and filtration work can be quickly re-started following cleaning, so that much more efficient filtration of the raw water W can be achieved.

The partition plates 2C are installed around the introduction ports 2A of the casings 2; and when raw water W inside the water storage tank 11 is introduced into the casings 2 via the opened introduction ports 2A, the introduction of raw water W in the water surface H into which the introduction ports 2A open is limited. More specifically, since the partition plates 2C are provided so that the plates surround the outer circumferences of the casings 2 at substantially the same height as the introduction ports 2A, the raw water W in the water surface H located to the outside of the partition plates 2C does not flow into the introduction ports 2A "as is"; instead, only raw water W that is below the water surface H is introduced into the interiors of the casings 2 via the introduction ports 2A from the spaces between the partition plates 2C and casings 2 as indicated by the white arrows in FIGS. 6, 10 and 11. Accordingly, even if dust or dirt, etc., is floating in the water surface H of the raw water W held inside the water storage tank 11, there is no loss of filtration efficiency as a result of such dust or dirt entering the interiors of the casings and adhering to the surfaces of the filtration modules 3, and even more efficient filtration can be promoted.

Meanwhile, the active carbon C that has adsorbed mud or organic matter, etc., contained in the raw water W introduced into the interiors of the casings 2, or adhering matter that has been stripped from the filtration modules 3 by cleaning, settles to the bottoms inside the casings 2. However, in the above filtration units 1, one end of the discharge pipe 7B connected to the discharge suction pump 7A used as the discharge means 7 is caused to open in the bottom of each of the casings 2, so that adhering matter, etc., that has thus settled into the bottoms of the casings 2 can be quickly sucked up and discharged together with the raw water W inside the casings 2. Accordingly, adhering matter that has thus settled is prevented from accumulating as a deposit in the bottoms inside the casings 2 and being taken up inside the casings 2 by the raw water W that is introduced following cleaning, so that much more efficient filtration is achieved, and filtration work is quickly re-started following cleaning. Furthermore, in the above embodiment, the bottom of each one of the casings 2 is in a pointed shape that protrudes downward, so that the adhering matter, etc., that has settled is collected at the lower end of the pointed bottom; and the lower ends of the discharge pipes 7B open near such a pointed bottom. Accordingly, the settled adhering matter is discharged through the discharge pipes 7B more quickly and more efficiently.

Furthermore, the discharge pipes 7B of the shown embodiment are provided so that they pass through the interiors of the casings 2 from the upper openings of the casings 2 and so that the lower ends of the discharge pipes 7B open in the bottoms of the casings 2. Consequently, the portions of the discharge pipes that are immersed in the raw water W contained inside the water storage tank 11 are not outside of the casings 2. Accordingly, a problem such as the need to make the gap between the discharge pipes 7B and the walls of the water storage tank 11 larger than would otherwise be necessary in order to avoid interference between the discharge pipes 7B and the walls of the water storage tank 11 is prevented. In addition a problem such as the need to make the gaps between the filtration units 1 larger than would otherwise be necessary in order to avoid interference between the discharge pipes 7B of the respective filtration units 1 in cases where a plurality of filtration units 1 are provided inside the water storage tank 11 as in the present embodiment, i.e., a problem which arises in cases where the discharge pipes 7B are disposed outside the casings 2, is prevented. As a result, filtration units 1 of a sufficient size and number can be securely installed even in a water storage tank 11 of limited size.

Furthermore, as a result of the discharge pipes 7B that is provide so as to run through the interiors of the casings 2, there is no need to form through-holes in the walls of the casings 2 or to attach the discharge pipes 7B so that the discharge pipes 7B pass through the holes in a liquid-tight manner, as there is in cases where, for example, such discharge pipes 7B are passed through into the interiors of the casings 2 from the outside parts of the casings 2. Accordingly, designing and manufacturing of the filtration units 1 can be facilitated. Moreover, in the above embodiment, the membrane filtered water pipes 3A of the filtration modules 3 and the air pipe 4B of the aeration means which functions as the agitation means 4 and cleaning means are also likewise caused to extend through the interiors of the casings 2 from the upper openings of the casings 2. Accordingly, an even more secure disposition of the filtration units 1 and a simplification of the design and manufacture of the filtration units 1 are achieved.

Furthermore, the filtration suction pump 3B of the above embodiment is connected to the filtration modules 3 via the membrane filtered water pipe 3A, and the filtered watery that is filtered from the raw water W by the filtration modules 3 is forcibly sucked in and discharged by this filtration suction pump 3B. Accordingly, much more reliable and efficient filtration is achieved. However, if sufficient suction of the filtered water T can be achieved by some other system, e.g., a method in which the filtered water is discharged by a gravity system or siphon system, there is no problem to use such a system.

By way of installing ultraviolet lamps inside the casings 2 so that the lamps face the filtration modules 3 as described above, even if microorganisms contained in the raw water W that is introduced into the interiors of the casings 2 should adhere to the surfaces of the filtration modules 3, such microorganisms can be killed and eradicated by ultraviolet light emitted from the ultraviolet lamps 6. It is thus possible to avoid the problem of sliminess being generated by the propagation of such microorganisms adhering to the surfaces of the filtration modules 3 so that it becomes difficult to strip away the adhering matter on the surfaces of the filtration modules 3 even by cleaning that uses the cleaning means, thus making it possible to maintain a high filtration efficiency over a long period of time. Furthermore, as a result of microorganisms thus being killed and eradicated by the ultraviolet lamps, there is little chemical residue in the filtered water T as there is in cases where, for example, a chemical solution is injected into the raw water W. Therefore, the time and cost required for the disposal of such residual chemicals can be reduced.

Meanwhile, in the filtration apparatus that is provided with the above filtration units 1 installed in a water storage tank 11, an increase in filtration efficiency and a reduction of costs are achieved in the filtration units 1 as described above. Accordingly, efficient and economical filtration of the raw water W is achieved in terms of the filtration apparatus as well.

Moreover, in the installation method of such a filtration apparatus and the filtration units 1 that are used to construct this filtration apparatus, since the filtration units 1 are positively employed, there is no need for large-scale modifications even in the case of, for example, a water storage tank 11 such as the final settling pond in the existing water cleaning plant, so that the present invention is applicable quickly and easily, and at a low cost., and so that the installation of the filtration units 1 is accomplished even while the water cleaning plant is being operated.

Furthermore, in the installation method for the filtration unit 1 of the above embodiment, and in the filtration apparatus of the above embodiment in which the filtration units 1 are installed using this installation method, the filtration units 1 are installed inside the water storage tank 11 on the opposite side from the side where the raw water W is introduced when seen from above or in a top view. Accordingly, relatively clear raw water W from which the major portion of the mud, etc., has been separated by precipitation following introduction into the water storage tank 11 can be introduced into the casings 2 of the filtration units 1 and filtered. Accordingly, the load on the filtration modules 3 of the filtration units 1 is alleviated, and a high filtration efficiency is maintained over a long period of time.

However, in the case where, for example, the mud discharge pit 15 is installed on the long-side end side of the rectangular settling tank main body 12 when seen from above or in a top view or the like, the underwater car 17 of the mud scraping means 16 can be made movable with the short-side direction of the above-described rectangular shape taken as the movement direction F. Furthermore, in the above-described embodiment, the filtration units 1 are installed in a water storage tank 11 (settling tank main body 12 and overflow trough tank 13) that has a rectangular shape in a top view. However, the filtration units 1 of the embodiment may also be applied to a water storage tank such as a cylindrical filtration tank that has a cylindrical shape in a top view as in, for example, the above-described Japanese Patent Application Laid-Open (Kokai) No. H8-57273. Here, in cases where the cylindrical water storage tank, etc., is divided into a central cylindrical section and an outer circumferential doughnut-shaped section, and raw water W is introduced into the cylindrical section (in the same manner as in the filtration apparatus described in Patent Reference 1), the filtration units 1 can be installed on the opposite side from the side where this raw water W is introduced, i.e., in the doughnut-shaped section on the outer circumferential side of the water storage tank, etc.

Furthermore, the introduction ports 2A of the above embodiment are tubular members that pass through the upper wall surfaces of the casings 2, and the control means 2B are opening-and-closing valves that are installed in the tubular members. However, for example, the introduction ports 2A may also be formed as simple openings with a window frame configuration, etc., that are formed in the upper wall surfaces of the casings 2, and the control means 2B may be formed as doors with a flat plate configuration, etc., that open and close the openings. It is also possible that openings are not formed in the wall surfaces of the casings 2, and the upper openings of the rectangular tubular casings 2 themselves instead open into the water surface H of the raw water W. In more concrete terms, it is also possible to design so that the casings 2 be immersed so as to be positioned slightly below the water surface of the raw water W, thus causing the upper openings to function as introduction ports 2A, and so that rectangular tubular blocking walls, etc., whose dimensions are slightly greater than the peripheral dimensions of the casings 2 are installed around the peripheries of the upper parts of the casings 2 so that the blocking walls can be moved upward and downward by driving means, with the introduction of raw water W from the upper openings being controlled by way of raising and lowering the blocking walls as control means 2B.

Furthermore, for example, in cases where openings are formed in the wall surfaces of the casings 2 and taken as introduction ports 2A as described above, and doors that can be opened and closed are installed in the introduction ports 2A as control means 2B, if the introduction ports 2A are provided so as to be immersed and open into the raw water W at a point slightly below the water surface H of the raw water W in the water storage tank 11, then the introduction ports 2A open at a point lower than the water surface H, and the inflow of the raw water W in this water surface H together with floating matter such as dirt can be restricted even if partition plates 2C are not installed on the outer circumferences of the upper parts of the casings 2. Accordingly, the external dimensions of the filtration units 1 are reduced by an amount that corresponds to the omission of the partition plates 2C, and a larger number of filtration units 1 can be installed in the water storage tank, etc.

The invention claimed is:

1. A filtration unit comprising:
a casing having an elongated shape with a height being greater than a width and has a bottom, said casing for being disposed in a water storage tank into which raw water is introduced,
at least one introduction port provided in a side of said casing that introduces raw water contained in said water storage tank into said casing, said introduction port being a only entrance for raw water into said casing,
an active carbon supply means that supplies active carbon into said casing to be added to the raw water introduced into said casing,
an agitation means that agitates the raw water which is inside said casing and to which the active carbon has been added,
a filtration module provided in said casing that filters the raw water,
a back flow prevention means that prevents the raw water inside said casing from flowing back through said introduction port and being discharged into said water storage tank, and
a discharge means that discharges filtered water from said filtration module in said casing; and wherein
said at least one introduction port is disposed so as to open in a water surface of the raw water inside said water storage tank, and
a partition plate that restricts inflow of the raw water at said water surface is provided at least around said introduction port on an outer circumference of said casing, said partition plate extending above and below said water surface such that matter floating on said water surface of said raw water are prevent from entering said casing via said introduction port.

2. The filtration unit according to claim 1, wherein said back flow prevention means is a descending pipe that extends downward inside said casing from said introduction port, and a lower-end opening of said descending pipe is positioned below said agitation means.

3. The filtration unit according to claim 1, wherein said agitation means is an aeration means that agitates raw water inside said casing by scattering air inside said casing, said agitation means acting also as a cleaning means that cleans said filtration module.

4. The filtration unit according to claim 1, wherein
said filtration module includes a membrane filtered water pipe that discharges filtered water that has been filtered from the raw water,
said agitation means includes a fluid supply pipe from which a fluid that agitates the raw water inside said casing is supplied,
said discharge means includes a discharge pipe that discharges the filtered water; and wherein
at least one of said membrane filtered water pipe, fluid supply pipe and discharge pipe is provided so as to extend into an inside of said casing from an upper part of said casing.

5. The filtration unit according to claim 1, wherein said discharge means includes a discharge pipe that is connected to a discharge suction pump, said discharge pipe being opened in a bottom of said casing.

6. The filtration unit according to claim 1, wherein a control means that controls a flow of the raw water through said introduction port is provided in said introduction port.

7. The filtration unit according to claim 6, wherein said control means comprises a valve provided in said introduction port.

8. The filtration unit according to claim 1, wherein said casing has a rectangular tubular shape.

9. A method for installing a filtration unit, wherein at lest one of said filtration units according to any one of claims 1 through 8 is installed inside a water storage tank.

10. The method for installing a filtration unit according to claim 9, wherein said filtration unit is installed on an opposite side of said water storage tank, when seen from above, from a side on which the raw water is introduced.

11. The filtration unit according to claim 8, wherein a bottom of said casing is in a shape of a downwardly protruding truncated square pyramid.

12. A filtration apparatus, comprising at least one filtration unit according to any one of claims 1 through 8 which is provided inside a water storage tank.

13. The filtration apparatus according to claim 12, wherein said filtration unit is installed on an opposite side of said water storage tank, when viewed from above, from a side on which the raw water is introduced.

14. The filtration unit according to claim 1, further comprising an ultraviolet lamp provided in said casing facing said filtration module.

15. The filtration unit according to claim 1, wherein said casing is made from a corrosion resistant metal.

16. The filtration unit according to claim 15, wherein the corrosion resistant metal is stainless steel.

17. The filtration unit according to claim 1, comprising a plurality of said filtration modules provided in said casing.

18. The filtration unit according to claim 1, wherein said casing has an open top extending above said water surface.

* * * * *